United States Patent
Park et al.

(10) Patent No.: US 12,382,044 B2
(45) Date of Patent: Aug. 5, 2025

(54) VIDEO DECODING METHOD AND APPARATUS FOR OBTAINING QUANTIZATION PARAMETER, AND VIDEO ENCODING METHOD AND APPARATUS FOR TRANSMITTING QUANTIZATION PARAMETER

(71) Applicant: SAMSUNG ELECTRONICS CO., LTD., Suwon-si (KR)

(72) Inventors: Minwoo Park, Suwon-si (KR); Minsoo Park, Suwon-si (KR); Kiho Choi, Suwon-si (KR); Yinji Piao, Suwon-si (KR); Chanyul Kim, Suwon-si (KR); Yumi Sohn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/861,865

(22) Filed: Jul. 11, 2022

(65) Prior Publication Data

US 2022/0368909 A1    Nov. 17, 2022

Related U.S. Application Data

(63) Continuation of application No. PCT/KR2021/000275, filed on Jan. 8, 2021.
(Continued)

(51) Int. Cl.
*H04N 19/124* (2014.01)
*H04N 19/172* (2014.01)
(Continued)

(52) U.S. Cl.
CPC ......... *H04N 19/124* (2014.11); *H04N 19/172* (2014.11); *H04N 19/174* (2014.11);
(Continued)

(58) Field of Classification Search
CPC .. H04N 19/124; H04N 19/172; H04N 19/174; H04N 19/18; H04N 19/186; H04N 19/60; H04N 19/70
See application file for complete search history.

(56) References Cited

U.S. PATENT DOCUMENTS

| | | | |
|---|---|---|---|
| 9,270,990 B2 | 2/2016 | Lee et al. | |
| 9,510,002 B2 | 11/2016 | Tourapis et al. | |

(Continued)

FOREIGN PATENT DOCUMENTS

| | | |
|---|---|---|
| CN | 101888555 A | 11/2010 |
| CN | 103947204 A | 7/2014 |

(Continued)

OTHER PUBLICATIONS

Martin Pettersson et al, AHG9: On Picture Header Modifications, Joint Video Experts Team (JVET) of ITU-T SG 16 WP 3 and ISO/IEC JTC 1/SC 29/WG 11 Document: JVET-Q0270 Jan. 2020 (Page Total 7).

(Continued)

*Primary Examiner* — Dakshesh D Parikh
(74) *Attorney, Agent, or Firm* — Sughrue Mion, PLLC

(57) ABSTRACT

Provided is a video decoding method including: obtaining, from a picture parameter set, a quantization parameter (QP) initial value to be applied to a current picture, and picture header QP difference value information; when the picture header QP difference value information indicates that QP difference value information is present in a picture header of the current picture, obtaining a first QP difference value for the current picture from the picture header; determining a QP for a coding unit included in the current picture, by using the QP initial value and the first QP difference value; obtaining transform coefficients of the coding unit by performing inverse quantization on the coding unit by using the (Continued)

QP; and reconstructing the coding unit by using the transform coefficients.

3 Claims, 32 Drawing Sheets

Related U.S. Application Data

(60) Provisional application No. 62/959,452, filed on Jan. 10, 2020.

(51) Int. Cl.
*H04N 19/174* (2014.01)
*H04N 19/18* (2014.01)
*H04N 19/186* (2014.01)
*H04N 19/60* (2014.01)
*H04N 19/70* (2014.01)

(52) U.S. Cl.
CPC ........... *H04N 19/18* (2014.11); *H04N 19/186* (2014.11); *H04N 19/60* (2014.11); *H04N 19/70* (2014.11)

(56) References Cited

U.S. PATENT DOCUMENTS

| | | |
|---|---|---|
| 9,521,410 B2 | 12/2016 | Seregin et al. |
| 9,538,192 B2 | 1/2017 | Lee |
| 9,854,275 B2 | 12/2017 | Joshi et al. |
| 10,045,025 B2 | 8/2018 | Lee |
| 10,491,898 B2 | 11/2019 | Sullivan et al. |
| 10,827,173 B2 | 11/2020 | Lim et al. |
| 2009/0310680 A1 | 12/2009 | Jeon et al. |
| 2011/0274162 A1 | 11/2011 | Zhou et al. |
| 2013/0287103 A1 | 10/2013 | Seregin et al. |
| 2014/0092958 A1 | 4/2014 | Sato |
| 2014/0241422 A1 | 8/2014 | Lee et al. |
| 2014/0341276 A1* | 11/2014 | Lee ..................... H04N 19/124 375/240.03 |
| 2017/0013261 A1 | 1/2017 | Lin et al. |
| 2017/0230660 A1 | 8/2017 | Lee |
| 2019/0104318 A1 | 4/2019 | Sato |
| 2022/0337836 A1* | 10/2022 | Zhao ................... H04N 19/186 |

FOREIGN PATENT DOCUMENTS

| | | |
|---|---|---|
| CN | 104094600 A | 10/2014 |
| CN | 104754361 A | 7/2015 |
| EP | 2 678 944 B1 | 11/2019 |
| JP | 2014-195319 A | 10/2014 |
| KR | 10-2015-0016263 A | 2/2015 |
| KR | 10-2018-0065013 A | 6/2018 |
| KR | 10-1868121 B1 | 6/2018 |
| KR | 10-2019-0054942 A | 5/2019 |
| KR | 10-2019-0140422 A | 12/2019 |
| RU | 2 585 657 C2 | 6/2016 |
| RU | 2645291 C2 | 2/2018 |
| WO | 2013/002587 A2 | 1/2013 |
| WO | 2017/206826 A1 | 12/2017 |
| WO | 2018/066989 A1 | 4/2018 |

OTHER PUBLICATIONS

Communication dated Jul. 6, 2023 issued by the Korean Intellectual Patent Office in counterpart Korean Application No. 10-2021-0122782.
Communication dated Jun. 18, 2021 issued by the Korean Intellectual Property Office in counterpart Korean Application No. 10-2021-0002619.
Communication dated Feb. 16, 2021 issued by the Korean Intellectual Property Office in counterpart Korean Application No. 10-2021-0002619.
Communication dated Apr. 16, 2021 issued by the International Searching Authority in counterpart Application No. PCT/KR2021/000275 (PCT/ISA/220, PCT/ISA/210, and PCT/ISA/237).
Bross et al., "Versatile Video Coding (Draft 7)", Document: JVET-P2001-vE, Joint Video Experts Team (JVET) of ITU-T SG 16 WP 3 and ISO/IEC JTC 1/SC 29/WG 11, Oct. 2019, 490 total pages.
Communication issued on Dec. 14, 2023 by the European Patent Office for European Patent Application No. 21738240.7.
Jonatan Samuelsson et al. (Sharp Labs of America, Inc.), "AHG9: On Picture Header", Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q0259 (saved Dec. 31, 2019), 10 pages, XP030222998.
Hendry et al. (LG Electronics), "[AHG9]: On picture level and slice level tool parameters", Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q0200 (saved Dec. 30, 2019), 6 pages, XP030222887.
Martin Pettersson et al. (Ericsson), "AHG9: Fixes related to the picture header", Joint Video Experts Team (JVET) of ITU-T SG 16 WP 3 and ISO/IEC JTC 1/SC 29/WG 11, 18th Meeting: by teleconference, Apr. 15-24, 2020, Document: JVET-R0251 (saved Apr. 3, 2020), 4 pages, XP030286292.
W. Wan et al. (Broadcom), "AHG9: Signalling of constant parameter values", Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q0482, 7 pages, XP030223653.
Ling Li et al. (Tencent), "AHG12: Signaling of chroma presence in PPS and APS", Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q0420-v1 (saved Jan. 1, 2020), 3 pages, XP030223458.
Communication issued on Dec. 8, 2023 by the Russian Patent Office for Russian Patent Application No. 2022121567.
Communication dated Jan. 17, 2023 by the Korean Intellectual Property Office in counterpart Korean Application No. 10-2021-0122782.
Office Action issued on Jul. 31, 2024 by the Chinese Patent Office in corresponding CN Patent Application No. 202180020581.3.
Office Action issued on Aug. 26, 2024 by the Israeli Patent Office in corresponding IL Patent Application No. 294576.
Office Action issued on Jun. 18, 2024 by the Russian Patent Office in corresponding RU Patent Application No. 2024103017.
Communication dated Mar. 7, 2024, issued by the INDIA Intellectual Property Office in Indian Patent Application No. 202247044167.
Communication issued Jan. 1, 2025 by the Israel Patent Office in Israeli Patent Application No. 294576.
Communication issued Dec. 10, 2024 by the Japan Patent Office in Japanese Patent Application No. 2022-542286.
Communication issued Nov. 8, 2024 by the Federal Service for Intellectual Property of Russia in Russian Patent Application No. 2024103017.
"Evaluation of Prediction Structures for Multiview Video Coding and Optimization of Stereo Video Encoder", China National Database of Outstanding Master's Theses, Jun. 15, 2013, 127 pages.
L. Anegekuh, L. Sun, E. Jammeh, I. - H. Mkwawa and E. Ifeachor, "Content-Based Video Quality Prediction for HEVC Encoded Videos Streamed Over Packet Networks," in IEEE Transactions on Multimedia, vol. 17, No. 8, pp. 1323-1334, Aug. 2015, doi: 10.1109/TMM.2015.2444098.
Office Action issued on Apr. 2, 2025 by the Chinese Patent Office in corresponding CN Patent Application No. 202180020581.3.
Notice Of Allowance issued on Apr. 15, 2025 by the Japanese Patent Office in corresponding JP Patent Application No. 2022-542286.
Office Action issued on May 29, 2025 by the Russian Patent Office in corresponding RU Patent Application No. 2025100057.

* cited by examiner

FIG. 4
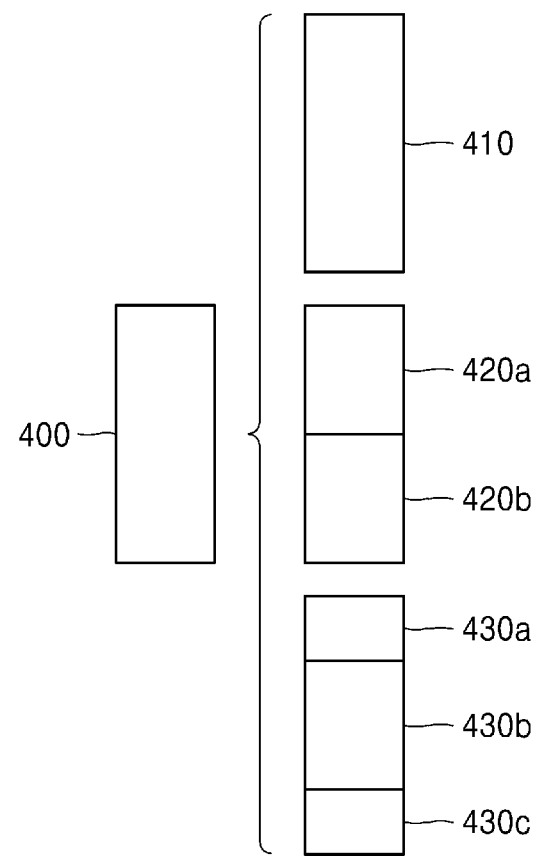
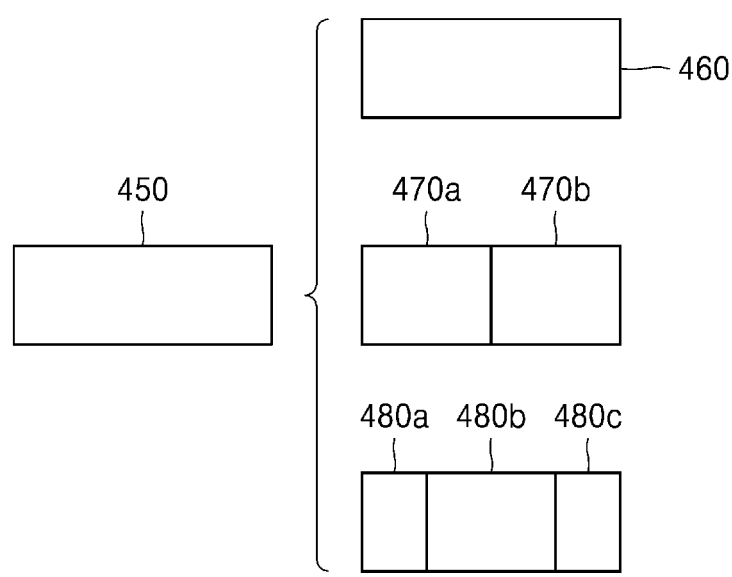

FIG. 13

| BLOCK SHAPE<br>DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 22

| pic_parameter_set_rbsp( ) { | Descriptor |
|---|---|
| ... | |
| pps_init_qp_minus26 | |
| ... | |
| pps_qp_delta_info_in_ph_flag | u(1) |
| ... | |

FIG. 23

| | picture_header_structure( ) { | Descriptor |
|---|---|---|
| 2300 → | ... | |
| 2310 → | if( pps_qp_delta_info_in_ph_flag ) | |
| 2320 → |    ph_qp_delta | se(v) |
| | ... | |
| | ... | |

FIG. 24

| slice_header( ) { | Descriptor |
|---|---|
| ... | |
|   if( !pps_qp_delta_info_in_ph_flag ) | |
|     sh_qp_delta | se(v) |
|   if( pps_slice_chroma_qp_offsets_present_flag ) { | |
|     sh_cb_qp_offset | se(v) |
|     sh_cr_qp_offset | se(v) |
|     if( sps_joint_cbcr_enabled_flag ) | |
|       sh_joint_cbcr_qp_offset | se(v) |
|   } | |
| ... | |

2400 — slice_header( ) {
2410 — if( !pps_qp_delta_info_in_ph_flag )
2420 — sh_qp_delta
2430 — sh_cb_qp_offset / sh_cr_qp_offset

FIG. 25

| | |
|---|---|
| 2500 — pic_parameter_set_rbsp( ) { | Descriptor |
| ... | |
| pps_deblocking_filter_control_present_flag | u(1) |
| if( pps_deblocking_filter_control_present_flag ) { | |
| pps_deblocking_filter_override_enabled_flag | u(1) |
| pps_deblocking_filter_disabled_flag | u(1) |
| if( !pps_no_pic_partition_flag && pps_deblocking_filter_override_enabled_flag ) | |
| 2510 — pps_dbf_info_in_ph_flag | u(1) |
| if( !pps_deblocking_filter_disabled_flag ) { | |
| pps_luma_beta_offset_div2 | se(v) |
| pps_luma_tc_offset_div2 | se(v) |
| if( pps_chroma_tool_offsets_present_flag ) { | |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |
| } | |
| ... | |

FIG. 26

| | Descriptor |
|---|---|
| 2600 — picture_header_structure( ) { | |
| ... | |
| 2610 — if( pps_dbf_info_in_ph_flag ) { | |
|   ph_deblocking_params_present_flag | u(1) |
|   if( ph_deblocking_params_present_flag ) { | |
|     if( !pps_deblocking_filter_disabled_flag ) | |
|       ph_deblocking_filter_disabled_flag | u(1) |
|     if( !ph_deblocking_filter_disabled_flag ) { | |
|       ph_luma_beta_offset_div2 | se(v) |
|       ph_luma_tc_offset_div2 | se(v) |
|       if( pps_chroma_tool_offsets_present_flag ) { | |
| 2620 —       ph_cb_beta_offset_div2 | se(v) |
|       ph_cb_tc_offset_div2 | se(v) |
|       ph_cr_beta_offset_div2 | se(v) |
|       ph_cr_tc_offset_div2 | se(v) |
|       } | |
|     } | |
|   } | |
| } | |
| ... | |

FIG. 27

| | Descriptor |
|---|---|
| 2700 — slice_header( ) { | |
| ... | |
| 2710 — if( pps_deblocking_filter_override_enabled_flag && !pps_dbf_info_in_ph_flag ) | |
|     sh_deblocking_params_present_flag | u(1) |
|     if( sh_deblocking_params_present_flag ) { | |
|       if( !pps_deblocking_filter_disabled_flag ) | |
|         sh_deblocking_filter_disabled_flag | u(1) |
|       if( !sh_deblocking_filter_disabled_flag ) { | |
|         sh_luma_beta_offset_div2 | se(v) |
|         sh_luma_tc_offset_div2 | se(v) |
|         if( pps_chroma_tool_offsets_present_flag ) { | |
| 2720 —           sh_cb_beta_offset_div2 | se(v) |
|           sh_cb_tc_offset_div2 | se(v) |
|           sh_cr_beta_offset_div2 | se(v) |
|           sh_cr_tc_offset_div2 | se(v) |
|         } | |
|       } | |
|     } | |
| ... | |

FIG. 28

| 2800 — | pic_parameter_set_rbsp( ) { | Descriptor |
|---|---|---|
| | ... | |
| | if( !pps_no_pic_partition_flag ) { | |
| 2810 — | pps_rpl_info_in_ph_flag | u(1) |
| 2820 — | pps_sao_info_in_ph_flag | u(1) |
| 2830 — | pps_alf_info_in_ph_flag | u(1) |
| | if( ( pps_weighted_pred_flag \|\| pps_weighted_bipred_flag ) && pps_rpl_info_in_ph_flag ) | |
| 2840 — | pps_wp_info_in_ph_flag | u(1) |
| | ... | |

FIG. 29

| | Descriptor |
|---|---|
| 2900 — picture_header_structure( ) { | |
| ... | |
| 2910 —   if( ( pps_weighted_pred_flag \|\| pps_weighted_bipred_flag ) && <br>     pps_wp_info_in_ph_flag ) | |
| 2920 —   pred_weight_table( ) | |
|   } | |
| ... | |
| 2930 —   if( sps_sao_enabled_flag && pps_sao_info_in_ph_flag ) { | |
|     ph_sao_luma_enabled_flag | u(1) |
| 2940 —     if( sps_chroma_format_idc != 0 ) | |
|       ph_sao_chroma_enabled_flag | u(1) |
|   } | |
| ... | |
| 2950 —   if( pps_rpl_info_in_ph_flag ) | |
| 2960 —   ref_pic_lists( ) | |
| ... | |

FIG. 30

| picture_header_structure( ) { | Descriptor |
|---|---|
| ... | |
| if( sps_alf_enabled_flag && pps_alf_info_in_ph_flag ) { | |
|   ph_alf_enabled_flag | |
|   if( ph_alf_enabled_flag ) { | |
|     ph_num_alf_aps_ids_luma | |
|     for( i = 0; i < ph_num_alf_aps_ids_luma; i++ ) | |
|       ph_alf_aps_id_luma[ i ] | |
|     if( sps_chroma_format_idc != 0 ) { | |
|       ph_alf_cb_enabled_flag | |
|       ph_alf_cr_enabled_flag | |
|     } | |
|     if( ph_alf_cb_enabled_flag \|\| ph_alf_cr_enabled_flag ) | |
|       ph_alf_aps_id_chroma | |
|     if( sps_ccalf_enabled_flag ) { | |
|       ph_alf_cc_cb_enabled_flag | |
|       if( ph_alf_cc_cb_enabled_flag ) | |
|         ph_alf_cc_cb_aps_id | |
|       ph_alf_cc_cr_enabled_flag | |
|       if( ph_alf_cc_cr_enabled_flag ) | |
|         ph_alf_cc_cr_aps_id | |
|     } | |
|   } | |
| } | |
| ... | |

FIG. 31

| | Descriptor |
|---|---|
| 3100 — slice_header( ) { | |
| ... | |
| 3110 — if( !pps_rpl_info_in_ph_flag && ( ( nal_unit_type != IDR_W_RADL && nal_unit_type != IDR_N_LP ) \|\| sps_idr_rpl_present_flag ) ) | |
| 3120 — ref_pic_lists( ) | |
| ... | |
| 3130 — if( !pps_wp_info_in_ph_flag && ( ( pps_weighted_pred_flag && sh_slice_type == P ) \|\| ( pps_weighted_bipred_flag && sh_slice_type == B ) ) ) | |
| 3140 — pred_weight_table( ) | |
| ... | |
| 3150 — if( sps_sao_enabled_flag && !pps_sao_info_in_ph_flag ) { | |
| sh_sao_luma_used_flag | u(1) |
| 3160 — if( sps_chroma_format_idc != 0 ) | |
| sh_sao_chroma_used_flag | u(1) |
| } | |
| ... | |

FIG. 32

| slice_header( ) { | Descriptor |
|---|---|
| ... | |
| if( sps_alf_enabled_flag && !pps_alf_info_in_ph_flag ) { | |
| sh_alf_enabled_flag | u(1) |
| if( sh_alf_enabled_flag ) { | |
| sh_num_alf_aps_ids_luma | u(3) |
| for( i = 0; i < sh_num_alf_aps_ids_luma; i++ ) | |
| sh_alf_aps_id_luma[ i ] | u(3) |
| if( sps_chroma_format_idc != 0 ) { | |
| sh_alf_cb_enabled_flag | u(1) |
| sh_alf_cr_enabled_flag | u(1) |
| } | |
| if( sh_alf_cb_enabled_flag || sh_alf_cr_enabled_flag ) | |
| sh_alf_aps_id_chroma | u(3) |
| if( sps_ccalf_enabled_flag ) { | |
| sh_alf_cc_cb_enabled_flag | u(1) |
| if( sh_alf_cc_cb_enabled_flag ) | |
| sh_alf_cc_cb_aps_id | u(3) |
| sh_alf_cc_cr_enabled_flag | u(1) |
| if( sh_alf_cc_cr_enabled_flag ) | |
| sh_alf_cc_cr_aps_id | u(3) |
| } | |
| } | |
| } | |
| ... | |

VIDEO DECODING METHOD AND APPARATUS FOR OBTAINING QUANTIZATION PARAMETER, AND VIDEO ENCODING METHOD AND APPARATUS FOR TRANSMITTING QUANTIZATION PARAMETER

CROSS-REFERENCE TO RELATED APPLICATIONS

This application is a Bypass Continuation of International Application No. PCT/KR2021/000275, filed on Jan. 8, 2021, which claims benefit to U.S. Provisional Application No. 62/959,452, filed at the U.S. Patent and Trademark Office, on Jan. 10, 2020, the disclosure of which are incorporated by reference herein in their entireties.

FIELD

The disclosure relates to a video decoding method and apparatus, and a video encoding method and apparatus, and more particularly, to methods and apparatuses for encoding and decoding videos by effectively performing a quantization parameter (QP).

RELATED ART

In a general compression method, square coding units are determined through recursive splitting processes in which it is determined whether to split a coding unit included in a picture while determining a size of the coding unit and then the coding unit is uniformly split into four coding units of the same size. However, recently, image quality deterioration of a reconstructed image caused by the use of coding units having the uniform shape of a square for a high-resolution image has become a problem. Accordingly, methods and apparatuses for splitting a high-resolution image into coding units of various shapes have been proposed.

SUMMARY

The disclosure relates to a video decoding method and apparatus, and a video encoding method and apparatus, and an object thereof is to provide a method by which a video encoding apparatus efficiently transmits a quantization parameter (QP) difference value and a method by which a video decoding apparatus efficiently obtains a QP difference value.

A video decoding method according to an embodiment provided in the disclosure may include: obtaining, from a picture parameter set, a quantization parameter (QP) initial value to be applied to a current picture, and obtaining, from the picture parameter set, picture header QP difference value information indicating whether QP difference value information is present in a picture header of the current picture; when the picture header QP difference value information indicates that the QP difference value information is present in the picture header of the current picture, obtaining a first QP difference value for the current picture from the picture header; determining a QP for a coding unit included in the current picture by using the QP initial value and the first QP difference value; obtaining transform coefficients of the coding unit by performing inverse quantization on the coding unit by using the QP; and reconstructing the coding unit by using the transform coefficients.

According to a video encoding method and a video decoding method, according to an embodiment, a method of transmitting a difference value of a quantization parameter (QP) may be determined according to a data transmission efficiency or a characteristic of a picture, and the difference value of the QP may be signaled according to the method.

A video decoding method according to an embodiment provided in the disclosure includes: obtaining, from a picture parameter set, a quantization parameter (QP) initial value to be applied to a current picture, and obtaining, from the picture parameter set, picture header QP difference value information indicating whether a first QP difference value information is present in a picture header of the current picture; when the picture header QP difference value information indicates that the first QP difference value information is present in the picture header of the current picture, obtaining a first QP difference value for the current picture from the picture header; determining a QP for a coding unit included in the current picture by using the QP initial value and the first QP difference value; obtaining transform coefficients of the coding unit by performing inverse quantization on the coding unit by using the QP; and reconstructing the coding unit by using the transform coefficients.

According to an embodiment, the video decoding method may further include: when the picture header QP difference value information indicates that the first QP difference value information is not present in the picture header, obtaining a second QP difference value for a current slice included in the current picture from a slice header of the current slice; determining a QP for a coding unit included in the current slice by using the QP initial value and the second QP difference value; obtaining transform coefficients of the coding unit by performing inverse quantization on the coding unit by using the QP; and reconstructing the coding unit by using the transform coefficients.

According to an embodiment, the obtaining of the transform coefficients of the coding unit by performing the inverse quantization on the coding unit by using the QP may include: obtaining, from the picture header, a QP difference value for a luma component of the current picture; determining a QP for a luma component of slices included in the current picture by adding the QP initial value and the first QP difference value for the luma component; and determining a QP of the coding unit included in the current picture and included in the slices, by using the QP for the luma component of the slices.

According to an embodiment, the determining of the QP of the coding unit may include: obtaining, from a bitstream, a QP difference value for the coding unit; and determining a QP for the luma component of the coding unit by using the QP for the luma component of the slices and the QP difference value for the coding unit.

According to an embodiment, the obtaining of the transform coefficients of the coding unit by performing the inverse quantization on the coding unit by using the QP may include: obtaining, from the slice header, the second QP difference value for a luma component of the current slice; determining a QP for the luma component of the current slice by adding the QP initial value and the second QP difference value for the luma component; and determining the QP of the coding unit included in the current slice by using the QP for the luma component of the current slice.

According to an embodiment, the determining of the QP of the coding unit may include: obtaining, from a bitstream, a QP difference value for the coding unit; and determining a QP for a luma component of the coding unit by using the QP for the luma component of the current slice and the QP difference value for the coding unit.

According to an embodiment, the obtaining of the transform coefficients of the coding unit by performing the inverse quantization on the coding unit by using the QP may include: obtaining, from the slice header, a Cb QP difference value for a Cb chroma component of the current slice and a Cr QP difference value for a Cr chroma component of the current slice; determining a Cb QP for a Cb chroma component of a current coding unit included in the current slice by updating a QP for a Cb chroma component of the current coding unit by using the Cb QP difference value for the Cb chroma component of the current slice; and determining a Cr QP for a Cr chroma component of the current coding unit by updating a QP for a Cr chroma component of the current coding unit by using the Cr QP difference value for the Cr chroma component of the current slice.

A video decoding apparatus according to an embodiment provided in the disclosure includes: an obtainer configured to obtain, from a picture parameter set, a QP initial value to be applied to a current picture, obtain, from the picture parameter set, picture header QP difference value information indicating whether a first QP difference value information is included in a picture header of the current picture, and when the picture header QP difference value information indicates that the QP first difference value information is included in the picture header, obtain, from the picture header, a first QP difference value for the current picture; and a decoder configured to, when the picture header QP difference value information indicates that the QP first difference value information is included in the picture header, determine a QP for a coding unit included in the current picture by using the QP initial value and the first QP difference value, obtain transform coefficients of the coding unit by performing inverse quantization on the coding unit by using the QP, and reconstruct the coding unit by using the transform coefficients of the coding unit.

A video encoding method according to an embodiment provided in the disclosure includes: determining a QP initial value to be applied to a current picture; when the QP initial value is determined for each picture, determining a first QP difference value between the QP initial value and a QP used in the current picture, and generating a picture header for the current picture, the picture header including the first QP difference value; and generating a picture parameter set including the QP initial value and picture header QP difference value information indicating whether QP first difference value information is present in the picture header of the current picture.

According to an embodiment, the video encoding method may further include: when the QP initial value is determined for each slice, determining a second QP difference value between the QP initial value and a QP used in a current slice included in the current picture, and generating a slice header for the current slice, the slice header including the second QP difference value.

According to an embodiment, the generating of the picture header for the current picture, the picture header including the first QP difference value, may include: determining a QP for a luma component of slices included in the current picture; and determining the first QP difference value for a luma component of the current picture by using a difference value between the QP initial value and the QP for the luma component of the slices included in the current picture.

According to an embodiment, the determining of the first QP difference value may include: determining a QP difference value for a coding unit by using a difference value between a QP for a luma component of the coding unit and the QP for the luma component of the slices; and encoding the QP difference value for the coding unit.

According to an embodiment, the generating of the slice header for the current slice, the slice header including the second QP difference value, may include: determining a QP for a luma component of the current slice; and determining the second QP difference value for the luma component of the current slice by using a difference value between the QP for the luma component of the current slice and the QP initial value.

According to an embodiment, the determining of the second QP difference value may include: determining a QP difference value for a coding unit by subtracting the QP for the luma component of the current slice from a QP for a luma component of the coding unit; and encoding the QP difference value for the coding unit.

According to an embodiment, the determining of the second QP difference value may include: determining a Cb QP difference value for a Cb chroma component of a current coding unit included in the current slice, the Cb QP difference value for determining a QP of the Cb chroma component of the current coding unit; determining a Cr QP difference value for a Cr chroma component of the current coding unit, the Cr QP difference value for determining a QP of the Cr chroma component of the current coding unit; and encoding the Cb QP difference value for the Cb chroma component of the current slice and the Cr QP difference value for the Cr chroma component of the current slice, and generating a slice header for the current slice, the slice header including the Cb QP difference value and the Cr QP difference value.

A computer-readable recording medium has recorded thereon a program for performing, on a computer, a video decoding method according to an embodiment of the disclosure.

A computer-readable recording medium has recorded thereon a program for performing, on a computer, a video encoding method according to an embodiment of the disclosure.

BRIEF DESCRIPTION OF DRAWINGS

A brief description of each drawing is provided to better understand the drawings cited herein.

FIG. 4 illustrates a process, performed by an image decoding apparatus, of determining at least one coding unit by splitting a non-square coding unit, according to an embodiment.

FIG. 13 illustrates a process of determining a depth of a coding unit as a shape and size of a coding unit change, when the coding unit is recursively split such that a plurality of coding units are determined, according to an embodiment.

FIG. 22 illustrates a picture parameter set including picture header QP difference value information, according to an embodiment.

FIG. 23 illustrates a picture header including a QP difference value of a current picture, according to an embodiment.

FIG. 24 illustrates a slice header including a QP difference value of a current slice, according to an embodiment.

FIG. 25 illustrates a picture parameter set including information indicating whether a picture header includes a deblocking filter-related parameter, according to an embodiment.

FIG. 26 illustrates a picture header including a deblocking filter-related parameter of a current picture, according to an embodiment.

FIG. 27 illustrates a slice header including a deblocking filter-related parameter of a current slice, according to an embodiment.

FIG. 28 illustrates a picture parameter set including information indicating whether a picture header includes various tool-related parameters, according to an embodiment.

FIG. 29 illustrates a picture header including a weighted prediction-related parameter, a sample adaptive offset (SAO)-related parameter, and a reference picture list-related parameter, of a current picture, according to an embodiment.

FIG. 30 illustrates a picture header including an adaptive loop filter (ALF)-related parameter of a current picture, according to an embodiment.

FIG. 31 illustrates a slice header including a reference picture list-related parameter, a weighted prediction-related parameter, and an SAO-related parameter, of a current slice, according to an embodiment.

FIG. 32 illustrates a slice header including an ALF-related parameter of a current slice, according to an embodiment.

DETAILED DESCRIPTION OF THE EMBODIMENTS

Figure 1:
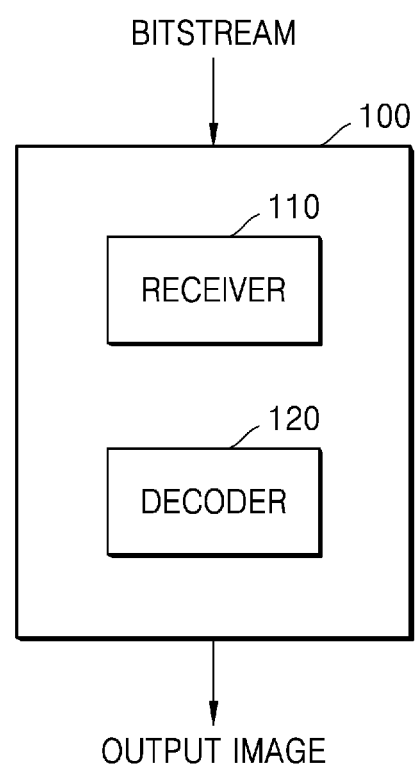
FIG. 1 is a schematic block diagram of an image decoding apparatus according to an embodiment.

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of embodiments, certain detailed explanations of related art are omitted when it is deemed that they may unnecessarily obscure the essence of the disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image of a video or a moving image, i.e., the video itself.

Also, in the present specification, a 'sample' denotes data assigned to a sampling position of an image, i.e., data to be processed. For example, pixel values of an image in a spatial domain and transform coefficients on a transform region may be samples. A unit including at least one such sample may be defined as a block.

Also, in the present specification, a 'current block' may denote a block of a largest coding unit, coding unit, prediction unit, or transform unit of a current image to be encoded or decoded.

In the present specification, a motion vector in a list 0 direction may denote a motion vector used to indicate a block in a reference picture included in a list 0, and a motion vector in a list 1 direction may denote a motion vector used to indicate a block in a reference picture included in a list 1. Also, a motion vector in a unidirection may denote a motion vector used to indicate a block in a reference picture included in a list 0 or list 1, and a motion vector in a bidirection may denote that the motion vector includes a motion vector in a list 0 direction and a motion vector in a list 1 direction.

Also, in the present specification, a 'binary split' of a block denotes a split for generating two subblocks of which a width or height is half the width or height of the block. In detail, when a 'binary vertical split' is performed on a current block, a split is performed in a vertical direction (longitudinal direction) at half the width of the current block, and thus two subblocks having a width that is half the width of the current block and the same height as the current block may be generated. When a 'binary horizontal split' is performed on the current block, a split is performed in a horizontal direction (traverse direction) at half the height of the current block, and thus two subblocks having a height that is half the height of the current block and the same width as the current block may be generated.

Also, in the present specification, a 'ternary split' of a block denotes a split for generating three subblocks of which the widths or heights are 1:2:1 of those of the block. In detail, when a 'ternary vertical split' is performed on a current block, a split is performed in a vertical direction (longitudinal direction) at points of 1:2:1 of the width of the current block, and thus two subblocks having a width that is ¼ the width of the current block and the same height as the current block, and one subblock having a width that is ⅔ the width of the current block and the same height as the current block may be generated. When a 'ternary horizontal split' is performed on the current block, a split is performed in a horizontal direction (traverse direction) at points of 1:2:1 of the height of the current block, and thus two subblocks having a height that is ¼ the height of the current block and the same width as the current block, and one subblock having a height that is ⅔ the height of the current block and the same width as the current block may be generated.

Also, in the present specification, a 'quad split' of a block denotes a split for generating four subblocks of which the widths and heights are 1:1 of those of the block. In detail, when the 'quad split' is performed on a current block, a split is performed in a vertical direction (longitudinal direction) at half the width of the current block and a split is performed in a horizontal direction (traverse direction) at half the height of the current block, and thus four subblocks having a width that is ½ the width of the current block and a height that is ½ the height of the current block may be generated.

Hereinafter, an image encoding apparatus and an image decoding apparatus, and an image encoding method and an image decoding method according to embodiments will be described with reference to FIGS. 1 through 16, with the expression "image" being interchangeable with "video". A method of determining a data unit of an image, according to an embodiment, will be described with reference to FIGS. 3 through 16, and a video encoding/decoding method according to an embodiment, using the determined data unit will be described with reference to FIGS. 17 through 40.

Hereinafter, a method and apparatus for adaptive selection based on various shapes of coding units, according to an embodiment of the disclosure, will be described with reference to FIGS. 1 and 2.

FIG. 1 is a schematic block diagram of an image decoding apparatus according to an embodiment.

An image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 1900 described later. Also, the bitstream may be transmitted from the image encoding apparatus 1900. The image encoding apparatus 1900 and the image decoding apparatus 100 may be connected via wires or wirelessly, and the receiver 110 may receive the bitstream via wires or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding apparatus 100 will be described in detail with reference to FIG. 2.

Figure 2:
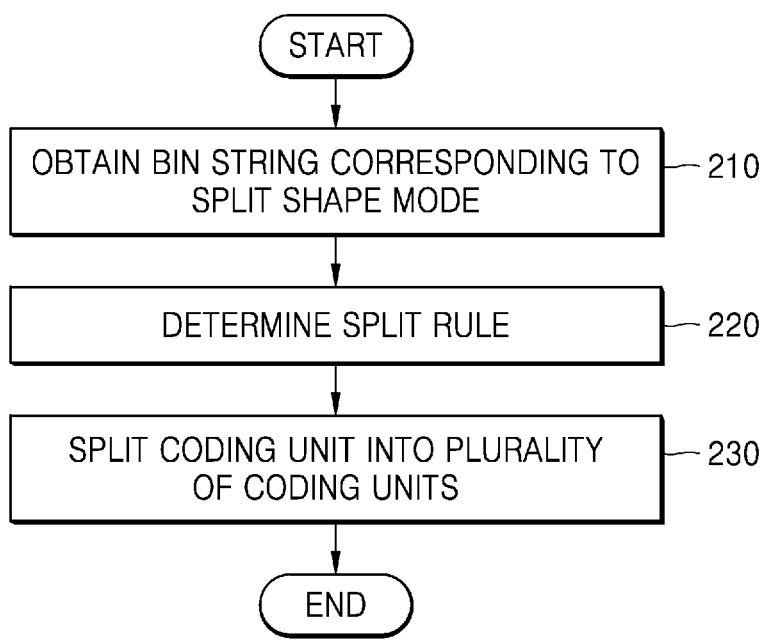
FIG. 2 is a flowchart of an image decoding method according to an embodiment.

FIG. 2 is a flowchart of an image decoding method according to an embodiment.

According to an embodiment of the disclosure, the receiver 110 receives a bitstream.

The image decoding apparatus 100 obtains, from a bitstream, a bin string corresponding to a split shape mode of a coding unit (operation 210). The image decoding apparatus 100 determines a split rule of the coding unit (operation 220). Also, the image decoding apparatus 100 splits the coding unit into a plurality of coding units, based on at least one of the bin string corresponding to the split shape mode or the split rule (operation 230). The image decoding apparatus 100 may determine an allowable first range of a size of the coding unit, according to a height to width ratio of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding unit (CTB) denotes an N×N block including N×N samples (N is an integer). Each color component may be split into one or more largest coding blocks.

When a picture includes three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of monochrome samples and syntax structures used to encode the monochrome samples. When a picture is a picture encoded in color planes separated according to color components, a largest coding unit includes the picture and syntax structures used to encode samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of monochrome samples and syntax structures used to encode the monochrome samples. When a picture is a picture encoded in color planes separated according to color components, a coding unit includes the picture and syntax structures used to encode samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a certain size including a certain number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the disclosure is not limited thereto.

For example, information about a largest size of a luma coding block may be obtained from a bitstream. For example, the largest size of the luma coding block indicated by the information about the largest size of the luma coding block may be one of 4×4, 8×8, 16×16, 32×32, 64×64, 128×128, or 256×256.

For example, information about a luma block size difference and a largest size of a luma coding block that may be split into two may be obtained from a bitstream. The information about the luma block size difference may refer to a size difference between a luma largest coding unit and a largest luma coding block that may be split into two. Accordingly, when the information about the largest size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a largest size of a luma coding block that is binary splittable is obtained from a bitstream, the largest size of the luma coding block that is binary splittable may be variably determined. In contrast, a largest size of a luma coding block that is ternary splittable may be fixed. For example, the largest size of the luma coding block that is ternary splittable in an !-picture may be 32×32, and the largest size of the luma coding block that is ternary splittable in a P-picture or a B-picture may be 64×64.

Also, a largest coding unit may be hierarchically split into coding units based on split shape mode information obtained from a bitstream. At least one of information indicating whether to perform quad splitting, information indicating whether to perform multi-splitting, split direction information, or split type information may be obtained as the split shape mode information from the bitstream.

For example, the information indicating whether to perform quad splitting may indicate whether a current coding unit is to be quad split (QUAD_SPLIT) or not.

When the current coding unit is not quad split, the information indicating whether to perform multi-splitting may indicate whether the current coding unit is to be no longer split (NO_SPLIT) or to be binary/ternary split.

When the current coding unit is binary split or ternary split, the split direction information indicates that the current coding unit is split in one of a horizontal direction or a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode SPLIT_BT_VER.

The image decoding apparatus 100 may obtain, from the bitstream, the bin string of the split shape mode information. A form of the bitstream received by the image decoding apparatus 100 may include fixed length binary code, unary code, truncated unary code, pre-determined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad-split a coding unit, whether not to split a coding unit, a split direction, and a split type, based on one bin string.

The coding unit may be smaller than or same as the largest coding unit. For example, because a largest coding unit is a coding unit having a largest size, the largest coding unit is one of coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 through 16.

Also, one or more prediction blocks for prediction may be determined from a coding unit. The prediction block may be the same as or smaller than the coding unit. Also, one or more transform blocks for transform may be determined from a coding unit. The transform block may be the same as or smaller than the coding unit.

The shapes and sizes of the transform block and prediction block may not be related to each other.

In another embodiment, prediction may be performed by using a coding unit as a prediction unit. Also, transform may be performed by using a coding unit as a transform block.

The splitting of the coding unit will be described in detail with reference to FIGS. 3 through 16. A current block and a neighboring block of the disclosure may indicate one of the largest coding unit, the coding unit, the prediction block, or the transform block. Also, the current block of the current coding unit is a block that is currently being decoded or encoded or a block that is currently being split. The neighboring block may be a block reconstructed before the current block. The neighboring block may be adjacent to the current block spatially or temporally. The neighboring block may be located at one of lower left, left, upper left, top, upper right, right, or lower right of the current block.

Figure 3:
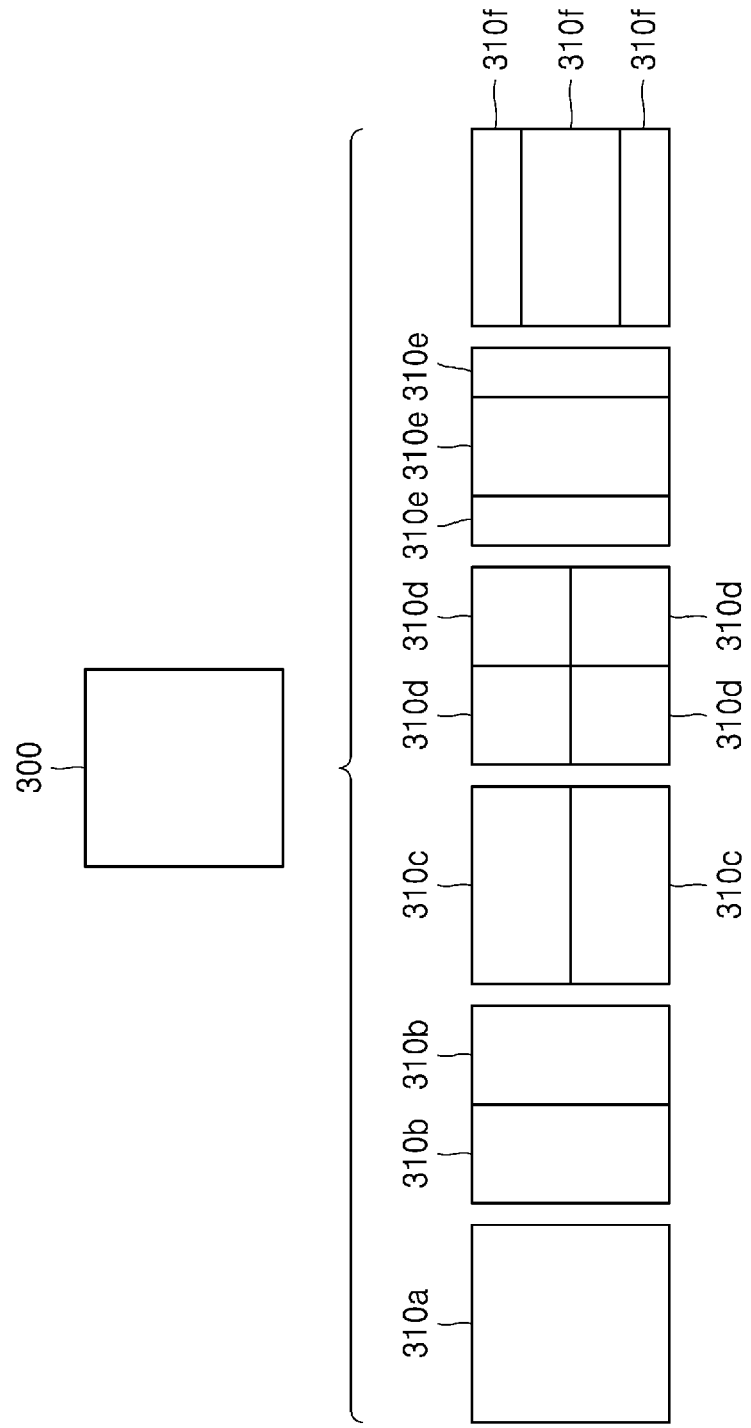
FIG. 3 illustrates a process, performed by an image decoding apparatus, of determining at least one coding unit by splitting a current coding unit, according to an embodiment.

FIG. 3 illustrates a process, performed by an image decoding apparatus, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, direction, a height to width ratio, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the height to width ratio among the block shape information of the coding unit to be at least one of 1:2, 2:1, 1:4, 4:1, 1:8, 8:1, 1:16, 16:1, 1:32, or 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 1900 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "no split". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "no split" with respect to the smallest coding unit.

According to an embodiment, the image decoding apparatus 100 may use the block shape information indicating that the current coding unit has a square shape. For example, the image decoding apparatus 100 may determine whether or not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310a having the same size as the current coding unit 300 is not split, based on the split shape mode information indicating no split, or may determine coding units 310b, 310c, 310d, 310e, or 310f split based on the split shape mode information indicating a certain splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary-splitting in a vertical direction. The image decoding apparatus 100 may determine three coding units 310f obtained by splitting the current coding unit 300 in a horizontal direction, based on the split shape mode information indicating to perform ternary-splitting in a horizontal direction. However, splitting methods of the square coding unit are not limited to the above-described methods, and the split shape mode information may indicate various methods. Certain splitting methods of splitting the square coding unit will be described in detail below in relation to various embodiments.

FIG. 4 illustrates a process, performed by an image decoding apparatus, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a certain splitting method, based on split shape mode information. Referring to FIG. 4, when the block shape information of a current coding unit 400 or 450 indicates a non-square shape, the image decoding apparatus 100 may determine that a coding unit 410 or 460 having the same size as the current coding unit 400 or 450 is not split, based on the split shape mode information indicating no split, or determine coding units 420a and 420b, 430a to 430c, 470a and 470b, or 480a to 480c split based on the split shape mode information indicating a certain splitting method. Certain splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting a long side of the current coding unit 400 or 450, in consideration of the shape of the current coding unit 400 or 450.

According to an embodiment, when the split shape mode information indicates to split (ternary-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a height to width ratio of the current coding unit 400 or 450 may be 4:1 or 1:4. When the height to width ratio is 4:1, the block shape information may be a horizontal direction because the length of the width is longer than the length of the height. When the height to width ratio is 1:4, the block shape information may be a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a to 430c by splitting the current coding unit 400 in the horizontal direction. Also, when the current coding unit 450 is in the horizontal direction, the image decoding apparatus 100 may determine the coding units 480a to 480c by splitting the current coding unit 450 in the vertical direction.

According to an embodiment, the image decoding apparatus 100 may determine the odd number of coding units included in the current coding unit 400 or 450, and not all the determined coding units may have the same size. For example, a certain coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a certain restriction on at least one coding unit from among the odd number of coding units generated by splitting the current coding unit 400 or 450. Referring to FIG. 4, the image decoding apparatus 100 may set a decoding process regarding the coding unit 430b or 480b located at the center among the three coding units 430a, 430b, and 430c or 480a, 480b, and 480c generated as the current coding unit 400 or 450 is split to be different from that of the other coding units 430a and 430c, or 480a or 480c. For example, the image decoding apparatus 100 may restrict the coding unit 430b or 480b at the center location to be no longer split or to be split only a certain number of times, unlike the other coding units 430a and 430c, or 480a and 480c.

Figure 5:
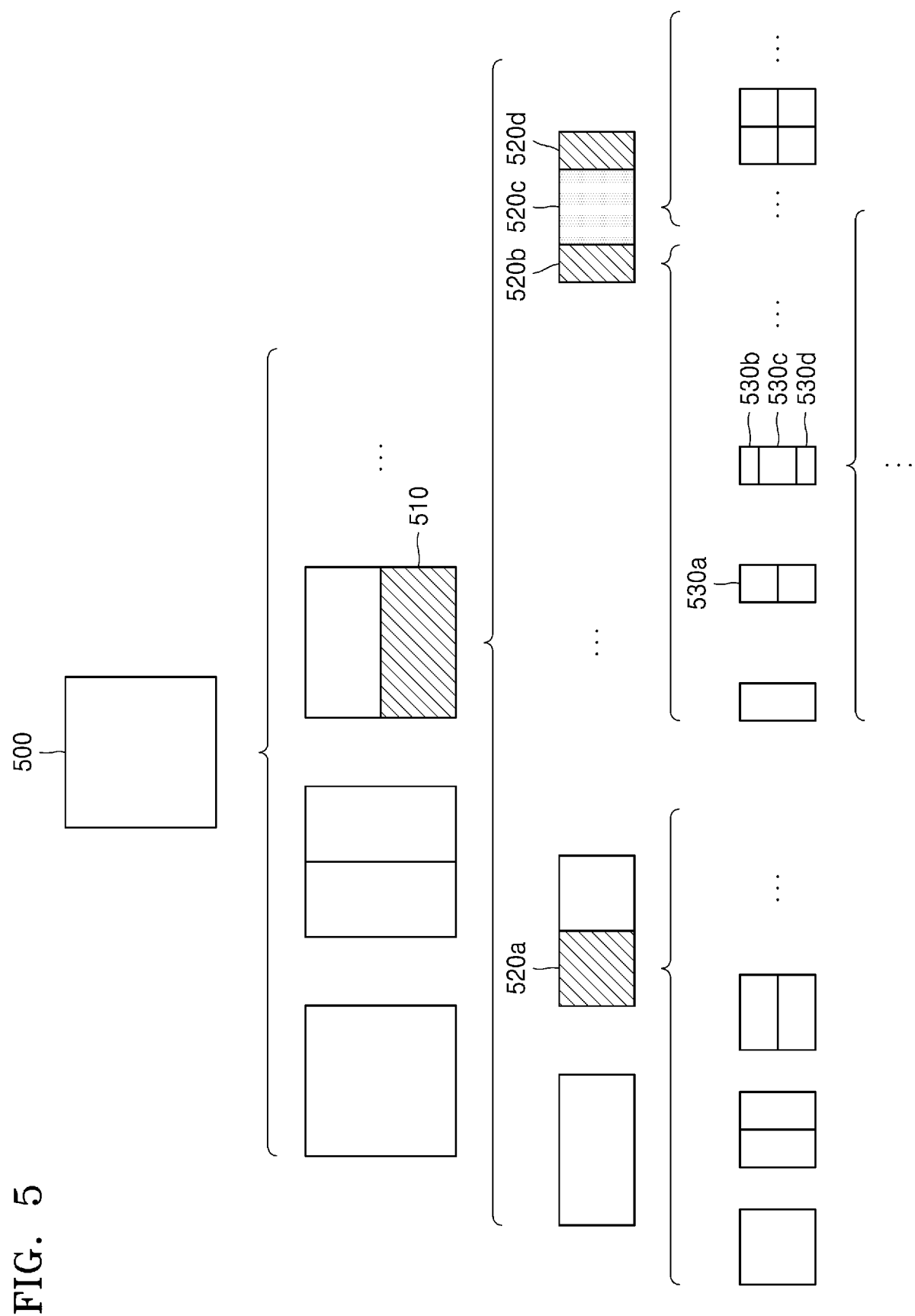
FIG. 5 illustrates a process, performed by an image decoding apparatus, of splitting a coding unit, based on at least one of block shape information or split shape mode information, according to an embodiment.

FIG. 5 illustrates a process, performed by an image decoding apparatus, of splitting a coding unit based on at least one of block shape information or split shape mode information, according to an embodiment.

According to an embodiment, the image decoding apparatus 100 may determine to split or not to split a square first coding unit 500 into coding units, based on at least one of the block shape information or the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may or may not split the non-square second coding unit 510, which is determined by splitting the first coding unit 500, into one or more third coding units 520a, or 520b, 520c, and 520d based on the split shape mode information. The image decoding apparatus 100 may obtain the split shape mode information, and may obtain a plurality of various-shaped second coding units (e.g., the second coding unit 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520a, or 520b, 520c, and 520d based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a certain coding unit from among the odd number of third coding units 520b, 520c, and 520d determined by splitting the non-square second coding unit 510 (e.g., a coding unit at a center location or a square coding unit) may be recursively split. According to an embodiment, the square third coding unit 520b from among the odd number of third coding units 520b, 520c, and 520d may be split in a horizontal direction into a plurality of fourth coding units. A non-square fourth coding unit 530b or 530d from among a plurality of fourth coding units 530a, 530b, 530c, and 530d may be split into a plurality of coding units again. For example, the non-square fourth coding unit 530b or 530d may be split into the odd number of coding units again. A method that may be used to recursively split a coding unit will be described below in relation to various embodiments.

According to an embodiment, the image decoding apparatus 100 may split each of the third coding units 520a, or 520b, 520c, and 520d into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a certain restriction on a certain third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a certain splitting method (e.g., split into only four coding units or split by using a splitting method of the second coding unit 510), or to be split only a certain number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain the split shape mode information, which is used to split a current coding unit, from a certain location in the current coding unit.

Figure 6:
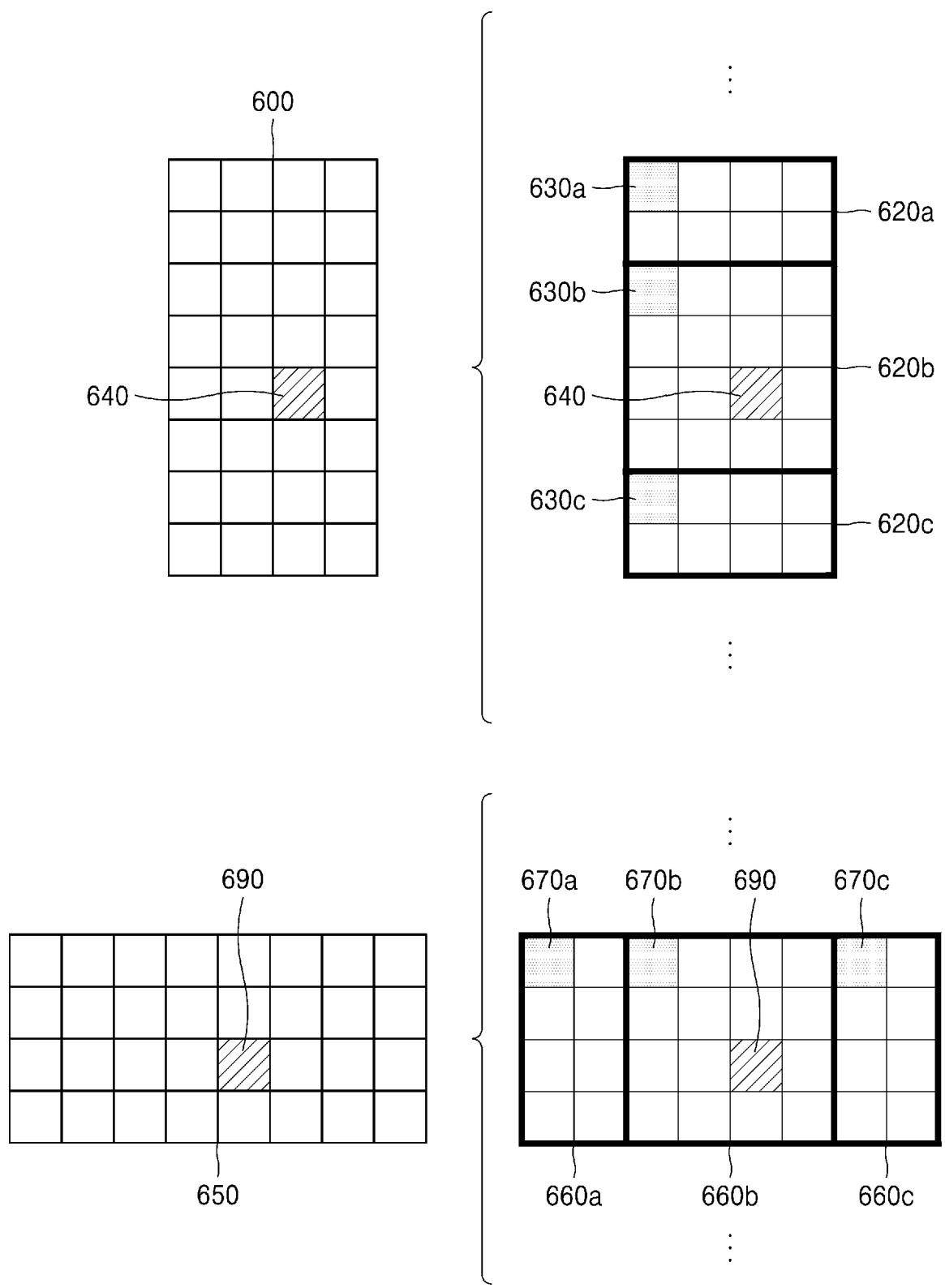
FIG. 6 illustrates a method, performed by an image decoding apparatus, of determining a certain coding unit from among an odd number of coding units, according to an embodiment.

FIG. 6 illustrates a method, performed by an image decoding apparatus, of determining a certain coding unit from among an odd number of coding units, according to an embodiment.

Referring to FIG. 6, split shape mode information of a current coding unit 600 or 650 may be obtained from a sample of a certain location (e.g., a sample 640 or 690 of a center location) from among a plurality of samples included in the current coding unit 600 or 650. However, the certain location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, and lower right locations). The image decoding apparatus 100 may obtain the split shape mode information from the certain location and may determine to split or not to split the current coding unit into various-shaped and various-sized coding units.

According to an embodiment, when the current coding unit is split into a certain number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a certain location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of certain samples included in the coding units 620a, 620b, and 620c. In detail, the image decoding apparatus 100 may determine the coding unit 620b at the center location by determining the locations of the coding units 620a, 620b, and 620c based on information indicating locations of upper left samples 630a, 630b, and 630c of the coding units 620a, 620b, and 620c.

According to an embodiment, the information indicating the locations of the upper left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the upper left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the upper left sample 630a of the upper coding unit 620a may include coordinates (xa, ya), information indicating the location of the upper left sample 630b of the middle coding unit 620b may include coordinates (xb, yb), and information indicating the location of the upper left sample 630c of the lower coding unit 620c may include coordinates (xc, yc). The image decoding apparatus 100 may determine the middle coding unit 620b by using the coordinates of the upper left samples 630a, 630b, and 630c which are included in the coding units 620a, 620b, and 620c, respectively. For example, when the coordinates of the upper left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper left samples 630a, 630b, and 630c may include coordinates indicating absolute locations in the picture, or may use coordinates (dxb, dyb) indicating a relative location of the upper left sample 630b of the middle coding unit 620b and coordinates (dxc, dyc) indicating a relative location of the upper left sample 630c of the lower coding unit 620c with reference to the location of the upper left sample 630a of the upper coding unit 620a. A method of determining a coding unit at a certain location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, or 620c based on a certain criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the upper left sample 630a of the upper coding unit 620a, the coordinates (xb, yb) that is the information indicating the location of the upper left sample 630b of the middle coding unit 620b, and the coordinates (xc, yc) that is the information indicating the location of the upper left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the certain location. However, the above-described method, performed by the image decoding apparatus 100, of determining a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

The image decoding apparatus 100 may determine the width or height of each of the coding units 660a, 660b, and 660c by using the coordinates (xd, yd) that is information indicating the location of a upper left sample 670a of the left coding unit 660a, the coordinates (xe, ye) that is information indicating the location of a upper left sample 670b of the middle coding unit 660b, and the coordinates (xf, yf) that is information indicating a location of the upper left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 600. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a to 660c. Referring to FIG. 6, the image decoding apparatus 100 may determine the middle coding unit 660b, which has a size different from the sizes of the left and right coding units 660a and 660c, as the coding unit of the certain location. However, the above-described method, performed by the image decoding apparatus 100, of determining a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a certain location from among an odd number of coding units determined by splitting the current coding unit, considering the shape of the current coding unit. For example, when the current coding unit has a non-square shape, a width of which is longer than a height, the image decoding apparatus 100 may determine the coding unit at the certain location in a horizontal direction. That is, the image decoding apparatus 100 may determine one of coding units having different locations in a horizontal direction and put a restriction on the coding unit. When the current coding unit has a non-square shape, a height of which is longer than a width, the image decoding apparatus 100 may determine the coding unit at the certain location in a vertical direction. That is, the image decoding apparatus 100 may determine one of coding units having different locations in a vertical direction and put a restriction on the coding unit.

According to an embodiment, the image decoding apparatus 100 may use information indicating respective locations of an even number of coding units, to determine the coding unit at the certain location from among the even number of coding units. The image decoding apparatus 100 may determine an even number of coding units by splitting (binary-splitting) the current coding unit, and may determine the coding unit at the certain location by using the information about the locations of the even number of coding units. An operation related thereto may correspond to the operation of determining a coding unit at a certain location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, certain information about a coding unit at a certain location may be used in a splitting operation to determine the coding unit at the certain location from among the plurality of coding units. For example, the image decoding apparatus 100 may use at least one of block shape information or split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, certain information for identifying the coding unit at the certain location may be obtained from a certain sample included in a coding unit to be determined. Referring to FIG. 6, the image decoding apparatus 100 may use the split shape mode information, which is obtained from a sample at a certain location in the current coding unit 600 (e.g., a sample at a center location of the current coding unit 600) to determine a coding unit at a certain location from among the plurality of the coding units 620a, 620b, and 620c determined by splitting the current coding unit 600 (e.g., a coding unit at a center location from among a plurality of split coding units). That is, the image decoding apparatus 100 may determine the sample at the certain location by considering a block shape of the current coding unit 600, determine the coding unit 620b including a sample, from which certain information (e.g., the split shape mode information) may be obtained, from among the plurality of coding units 620a, 620b, and 620c determined by splitting the current coding unit 600, and may put a certain restriction on the coding unit 620b. Referring to FIG. 6, according to an embodiment, the image decoding apparatus 100 may determine the sample 640 at the center location of the current coding unit 600 as the sample from which the certain information may be obtained, and may put a certain restriction on the coding unit 620b including the sample 640, in a decoding operation. However, the location of the sample from which the certain information may be obtained is not limited to the above-described location, and may include arbitrary locations of samples included in the coding unit 620b to be determined for a restriction.

According to an embodiment, the location of the sample from which the certain information may be obtained may be determined based on the shape of the current coding unit 600. According to an embodiment, the block shape information may indicate whether the current coding unit has a square or non-square shape, and the location of the sample from which the certain information may be obtained may be determined based on the shape. For example, the image decoding apparatus 100 may determine a sample located on a boundary for splitting at least one of a width or height of the current coding unit in half, as the sample from which the certain information may be obtained, by using at least one of information about the width of the current coding unit or information about the height of the current coding unit. As another example, when the block shape information of the current coding unit indicates a non-square shape, the image decoding apparatus 100 may determine one of samples including a boundary for splitting a long side of the current coding unit in half, as the sample from which the predetermined information may be obtained.

According to an embodiment, when the current coding unit is split into a plurality of coding units, the image decoding apparatus 100 may use the split shape mode information to determine a coding unit at a certain location from among the plurality of coding units. According to an embodiment, the image decoding apparatus 100 may obtain the split shape mode information from a sample at a certain location in a coding unit, and split the plurality of coding units, which are generated by splitting the current coding unit, by using the split shape mode information, which is obtained from the sample of the certain location in each of the plurality of coding units. That is, a coding unit may be recursively split based on the split shape mode information, which is obtained from the sample at the certain location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a certain block (e.g., the current coding unit).

Figure 7:
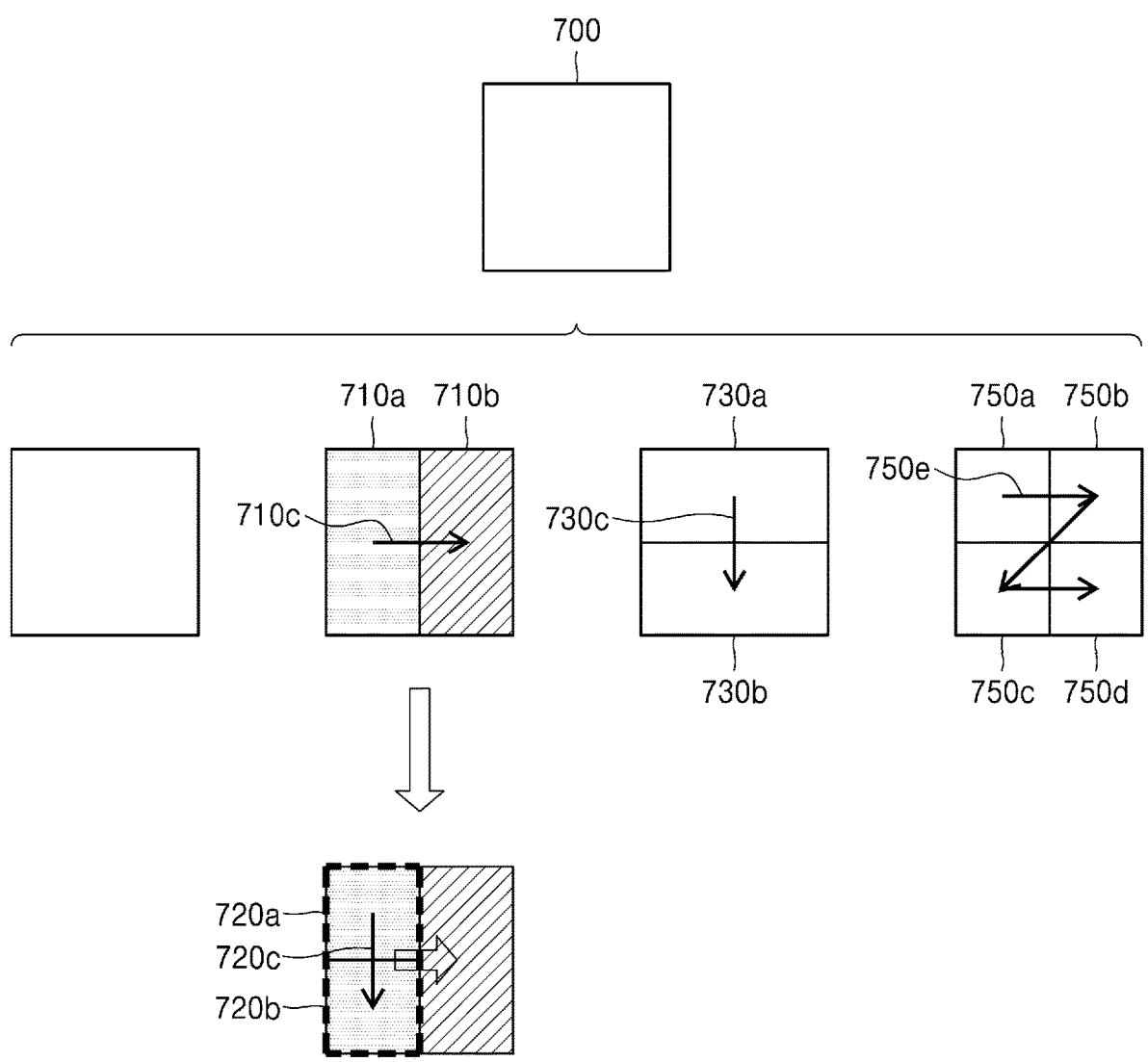
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when an image decoding apparatus determines the plurality of coding units by splitting a current coding unit, according to an embodiment.

According to an embodiment, the image decoding apparatus 100 may determine second coding units 710a and 710b by splitting a first coding unit 700 in a vertical direction, determine second coding units 730a and 730b by splitting the first coding unit 700 in a horizontal direction, or determine second coding units 750a to 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine to process the second coding units 750a to 750d, which are determined by splitting the first coding unit 700 in vertical and horizontal directions, in a certain order for processing coding units in a row and then processing coding units in a next row (e.g., in a raster scan order or Z-scan order 750e).

According to an embodiment, the image decoding apparatus 100 may recursively split coding units. Referring to FIG. 7, the image decoding apparatus 100 may determine the plurality of coding units 710a and 710b, 730a and 730b, or 750a to 750d by splitting the first coding unit 700, and recursively split each of the determined plurality of coding units 710b, 730a and 730b, or 750a to 750d. A splitting method of the plurality of coding units 710b, 730a and 730b, or 750a to 750d may correspond to a splitting method of the first coding unit 700. As such, each of the plurality of coding units 710b, 730a and 730b, or 750a to 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a certain order.

Figure 8:
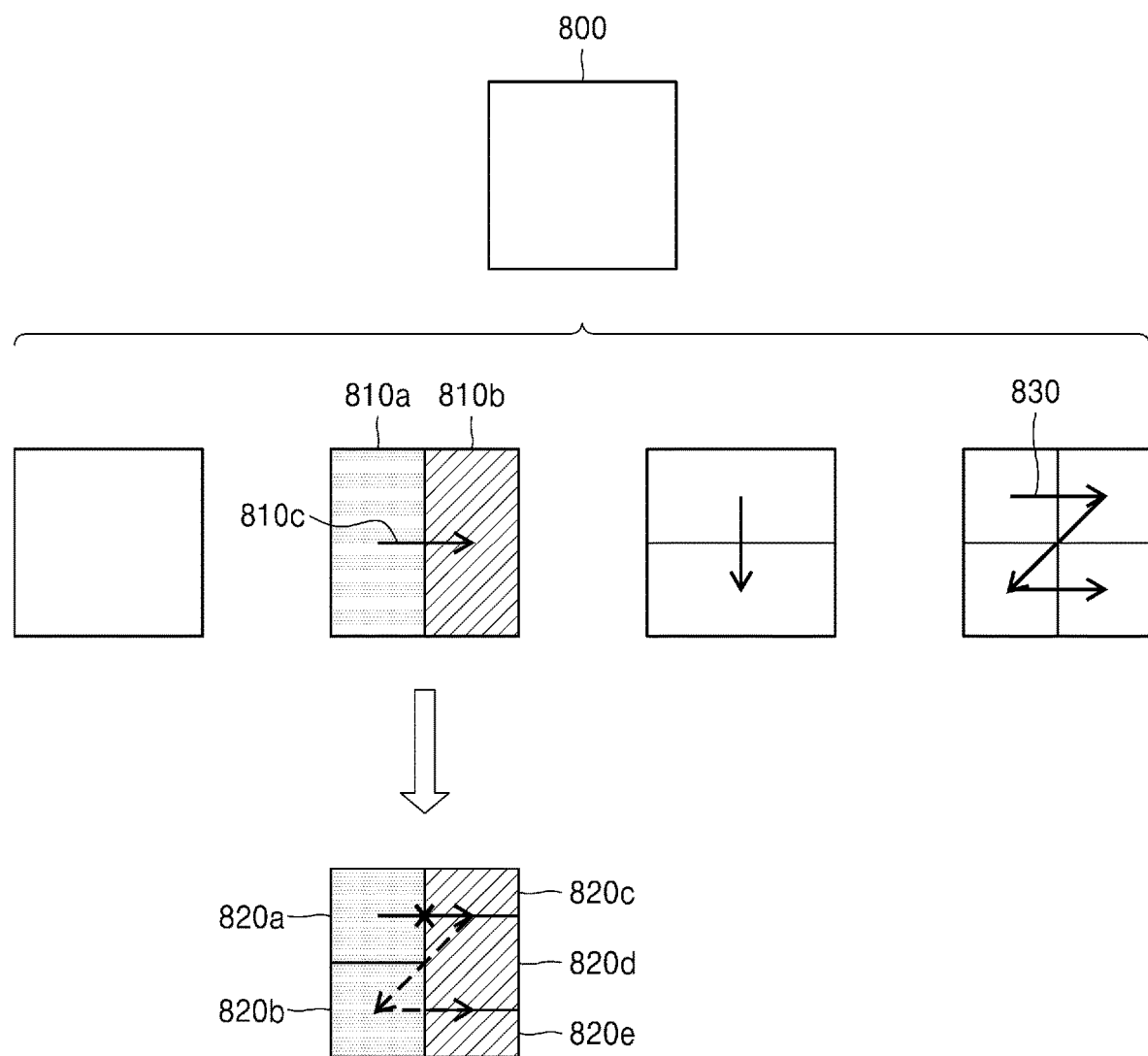
FIG. 8 illustrates a process, performed by an image decoding apparatus, of determining that a current coding unit is to be split into an odd number of coding units, when the coding units are not processable in a certain order, according to an embodiment.

FIG. 8 illustrates a process, performed by an image decoding apparatus, of determining that a current coding unit is to be split into an odd number of coding units, when the coding units are not processable in a predetermined order, according to an embodiment.

According to an embodiment, the image decoding apparatus 100 may determine whether the current coding unit is split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c to 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a certain order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, and the third coding units 820a and 820b, and 820c to 820e are split into an odd number of coding units, based on at least one of the block shape information or the split shape mode information. For example, the right second coding unit 810b among the second coding units 810a and 810b may be split into an odd number of third coding units 820c, 820d, and 820e. A processing order of a plurality of coding units included in the first coding unit 800 may be a certain order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the certain order.

According to an embodiment, the image decoding apparatus 100 may determine whether the third coding units 820a and 820b, and 820c to 820e included in the first coding unit 800 satisfy the condition for processing in the certain order, and the condition relates to whether at least one of a width or height of the second coding units 810a and 810b is split in half along a boundary of the third coding units 820a and 820b, and 820c to 820e. For example, the third coding units 820a and 820b determined when the height of the left second coding unit 810a of the non-square shape is split in half may satisfy the condition. It may be determined that the third coding units 820c to 820e do not satisfy the condition because the boundaries of the third coding units 820c to 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is split into an odd number of coding units, based on a result of the determination. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus detailed descriptions thereof are not provided again.

Figure 9:
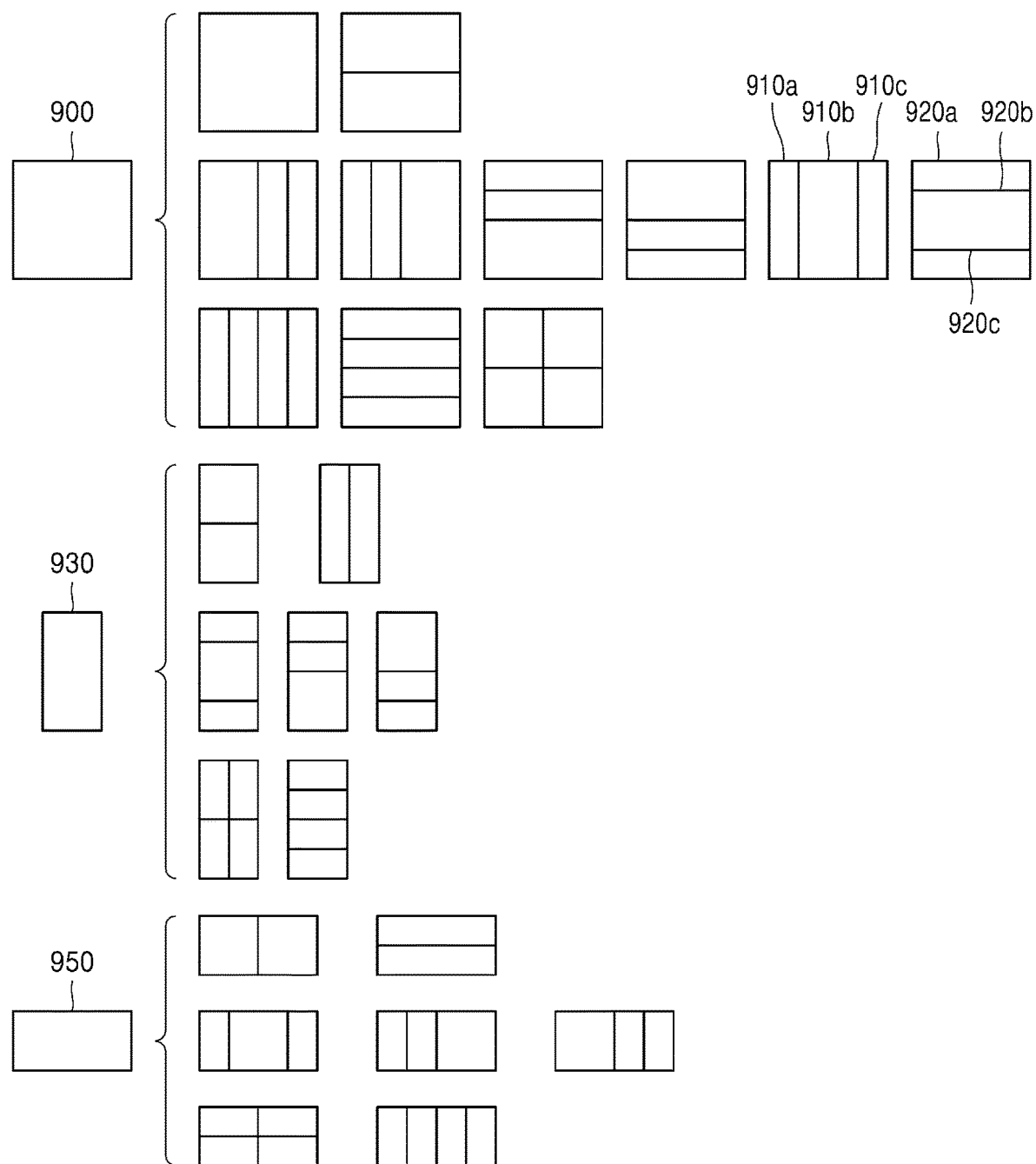
FIG. 9 illustrates a process, performed by an image decoding apparatus, of determining at least one coding unit by splitting a first coding unit, according to an embodiment.

FIG. 9 illustrates a process, performed by an image decoding apparatus, of determining at least one coding unit by splitting a first coding unit, according to an embodiment.

According to an embodiment, the image decoding apparatus 100 may split the first coding unit 900, based on split shape mode information, which is obtained through the receiver 110. The square first coding unit 900 may be split into four square coding units, or may be split into a plurality of non-square coding units. For example, referring to FIG. 9, when the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a certain order, and the condition relates to whether at least one of a width or height of the first coding unit 900 is split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the certain order. In addition, because boundaries of the second coding units 920a, 920b, and 920c determined by splitting the square first coding unit 900 in a horizontal direction do not split the width of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is split into an odd number of coding units, based on a result of the decision. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus detailed descriptions thereof are not provided again.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
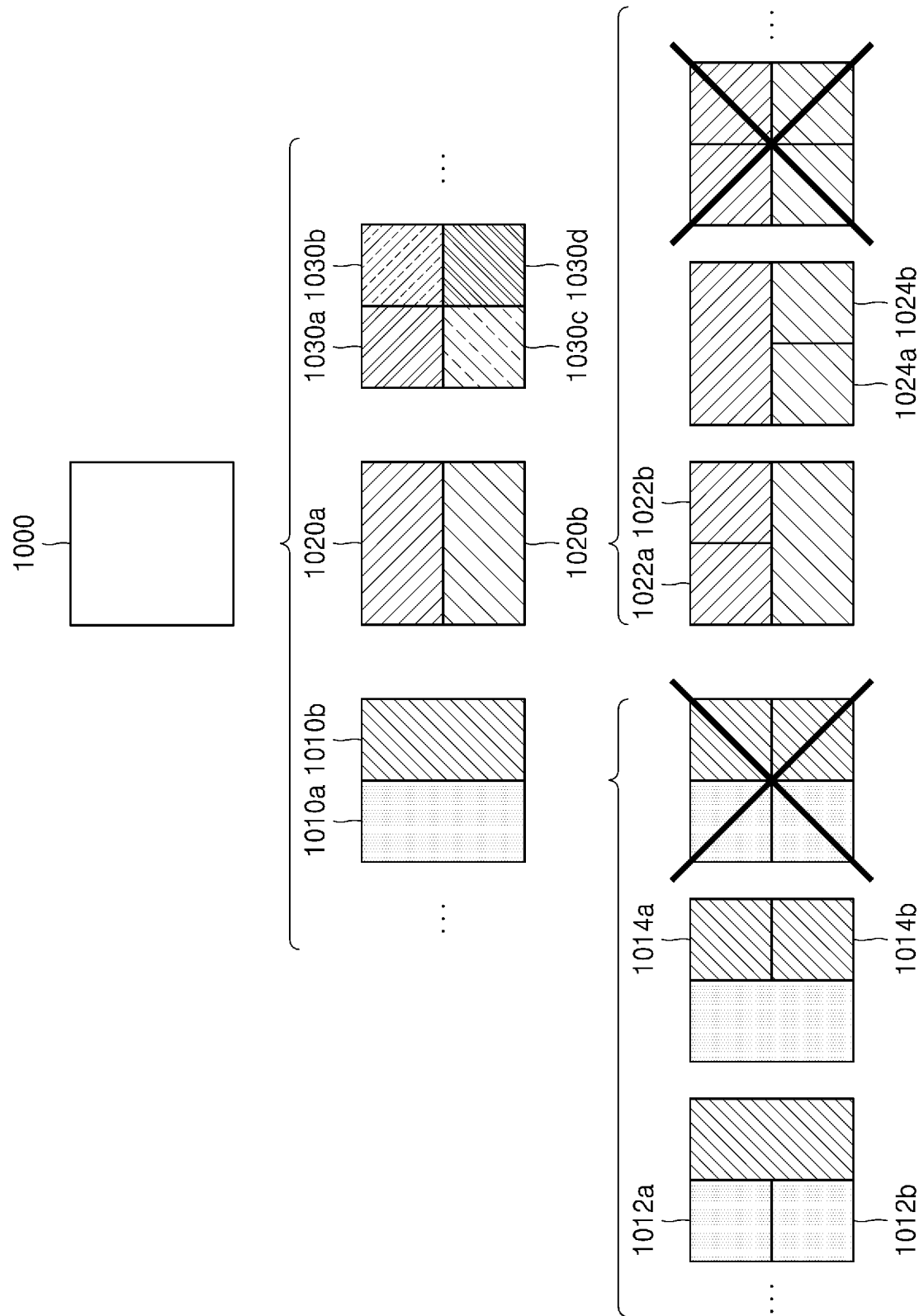
FIG. 10 illustrates that a shape into which a second coding unit is splittable is restricted when the second coding unit having a non-square shape, which is determined when an image decoding apparatus splits a first coding unit, satisfies a certain condition, according to an embodiment.

FIG. 10 illustrates that a shape into which a second coding unit is splittable is restricted when the second coding unit having a non-square shape, which is determined when an image decoding apparatus splits a first coding unit, satisfies a certain condition, according to an embodiment.

According to an embodiment, the image decoding apparatus 100 may determine to split the square first coding unit 1000 into non-square second coding units 1010a, and 1010b or 1020a and 1020b, based on split shape mode information, which is obtained by the receiver 110. The second coding units 1010a and 1010b or 1020a and 1020b may be independently split. As such, the image decoding apparatus 100 may determine to split or not to split each of the second coding units 1010a and 1010b or 1020a and 1020b into a plurality of coding units, based on the split shape mode information of each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b not to be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) not to be split in a vertical direction in which the upper second coding unit 1020a is split.

Figure 11:
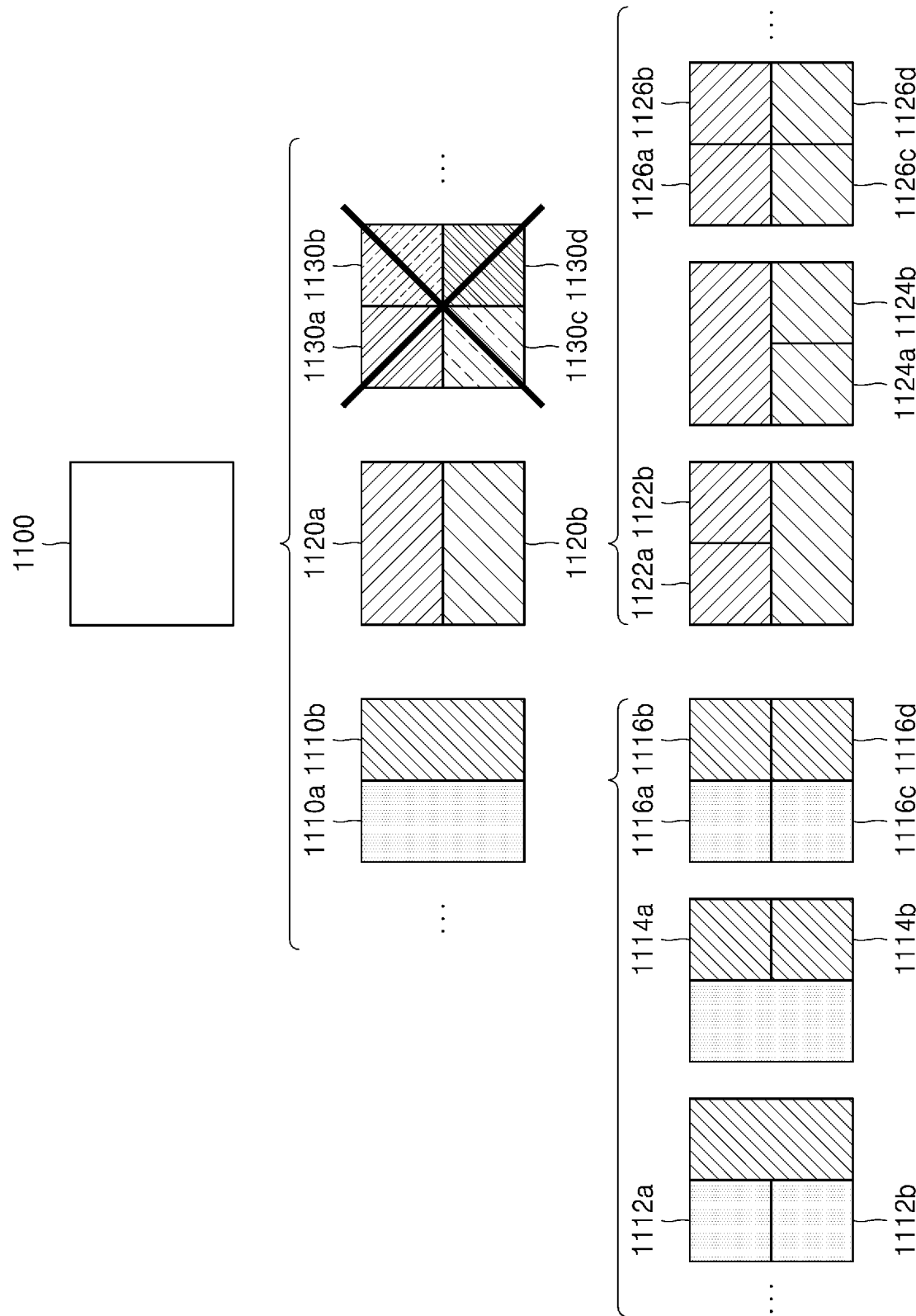
FIG. 11 illustrates a process, performed by an image decoding apparatus, of splitting a square coding unit when split shape mode information is unable to indicate that the square coding unit is split into four square coding units, according to an embodiment.

FIG. 11 illustrates a process, performed by an image decoding apparatus, of splitting a square coding unit when split shape mode information is unable to indicate that the square coding unit is split into four square coding units, according to an embodiment.

According to an embodiment, the image decoding apparatus 100 may determine second coding units 1110a and 1110b or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the split shape mode information.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a certain order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
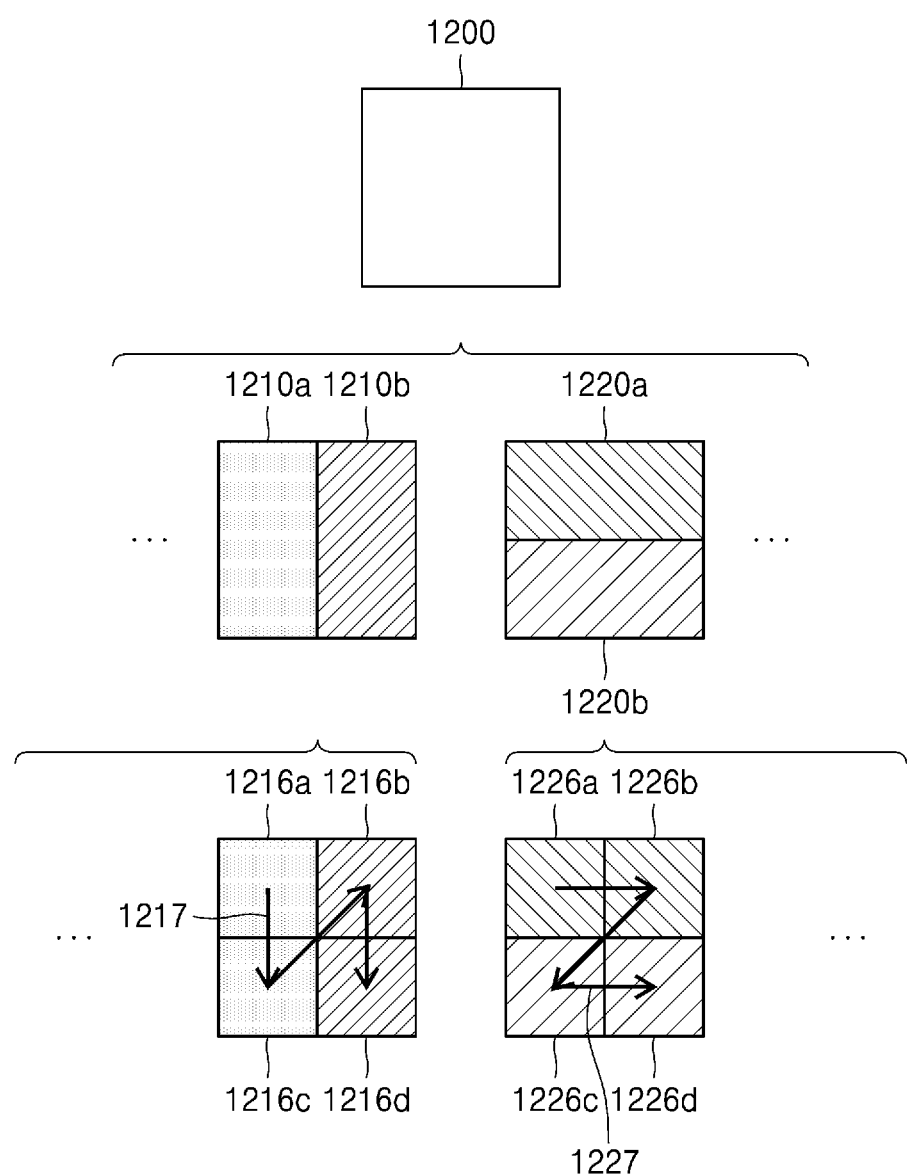
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of a horizontal direction or a vertical direction, the image decoding apparatus 100 may determine second coding units 1210a and 1210b or 1220a and 1220b, etc. by splitting the first coding unit 1200. Referring to FIG. 12, the non-square second coding units 1210a and 1210b or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a horizontal direction. An operation of splitting the second coding units 1210a and 1210b or 1220a and 1220b has been described above in relation to FIG. 11, and thus detailed descriptions thereof will not be provided herein.

According to an embodiment, the image decoding apparatus 100 may process coding units in a certain order. An operation of processing coding units in a predetermined order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a splitting method of the first coding unit 1200.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a certain criterion. For example, the certain criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width or height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width or height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width or height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width or height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width or height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
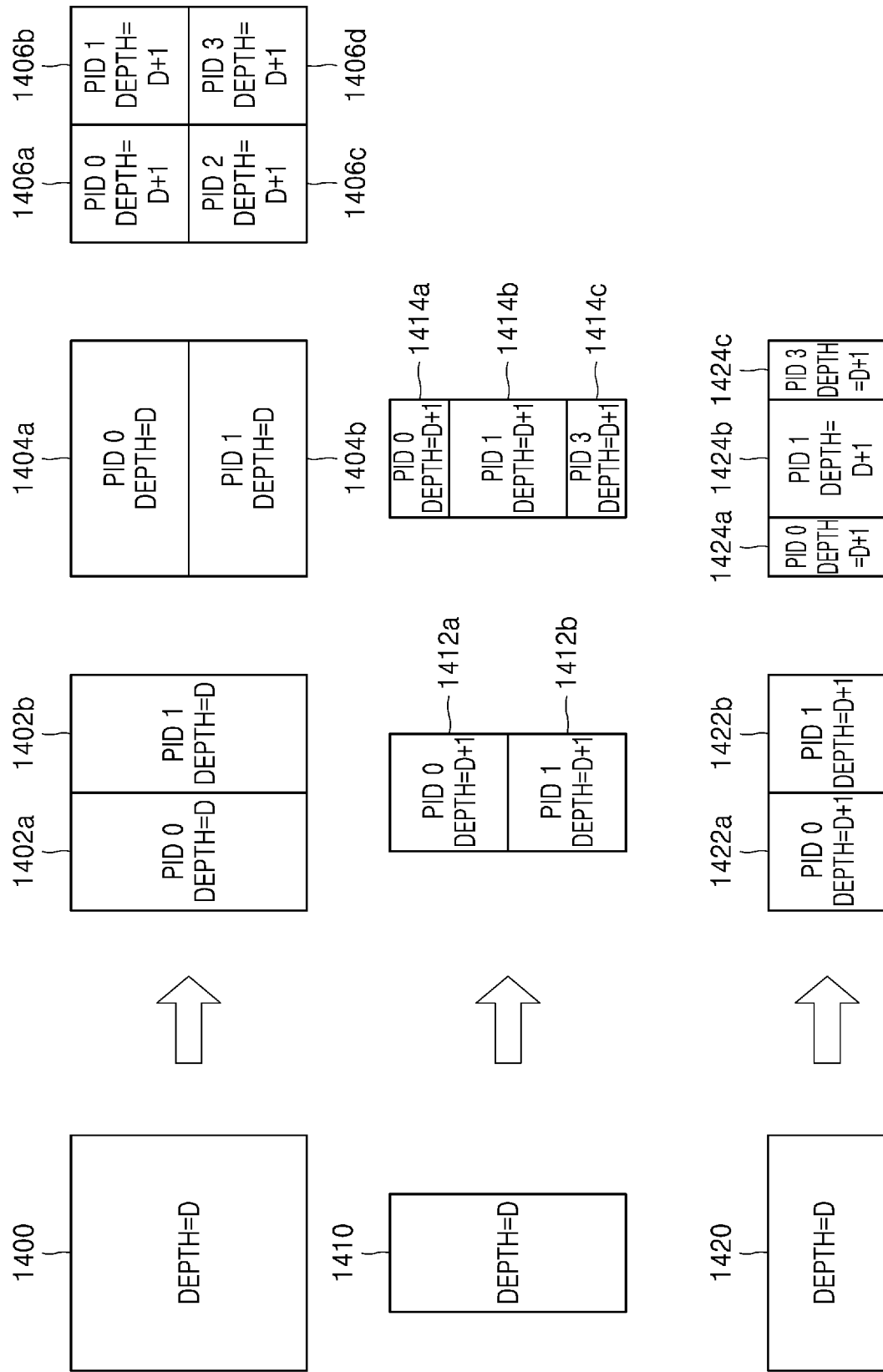
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of a vertical direction or a horizontal direction based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, a depth of the second coding units 1402a and 1402b, 1404a and 1404b, and 1406a, 1406b, 1406c, and 1406d, which are determined based on the split shape mode information of the square first coding unit 1400, may be determined based on the length of a long side thereof. For example, because the length of a side of the square first coding unit 1400 equals the length of a long side of the non-square second coding units 1402a and 1402b, and 1404a and 1404b, the square first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, depths of the second coding units 1412a and 1412b, and 1414a, 1414b, and 1414c, or 1422a and 1422b, and 1424a, 1424b, and 1424c that are determined based on the split shape mode information of the non-square first coding unit 1410 or 1420 may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample of a certain location of each coding unit (e.g., an upper left sample).

According to an embodiment, the image decoding apparatus 100 may determine a coding unit at a certain location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PI Ds of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a certain location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the certain location are not limited to the above-described examples, and various PIDs and various locations and sizes of coding units may be used.

According to an embodiment, the image decoding apparatus 100 may use a certain data unit where a coding unit starts to be recursively split.

Figure 15:
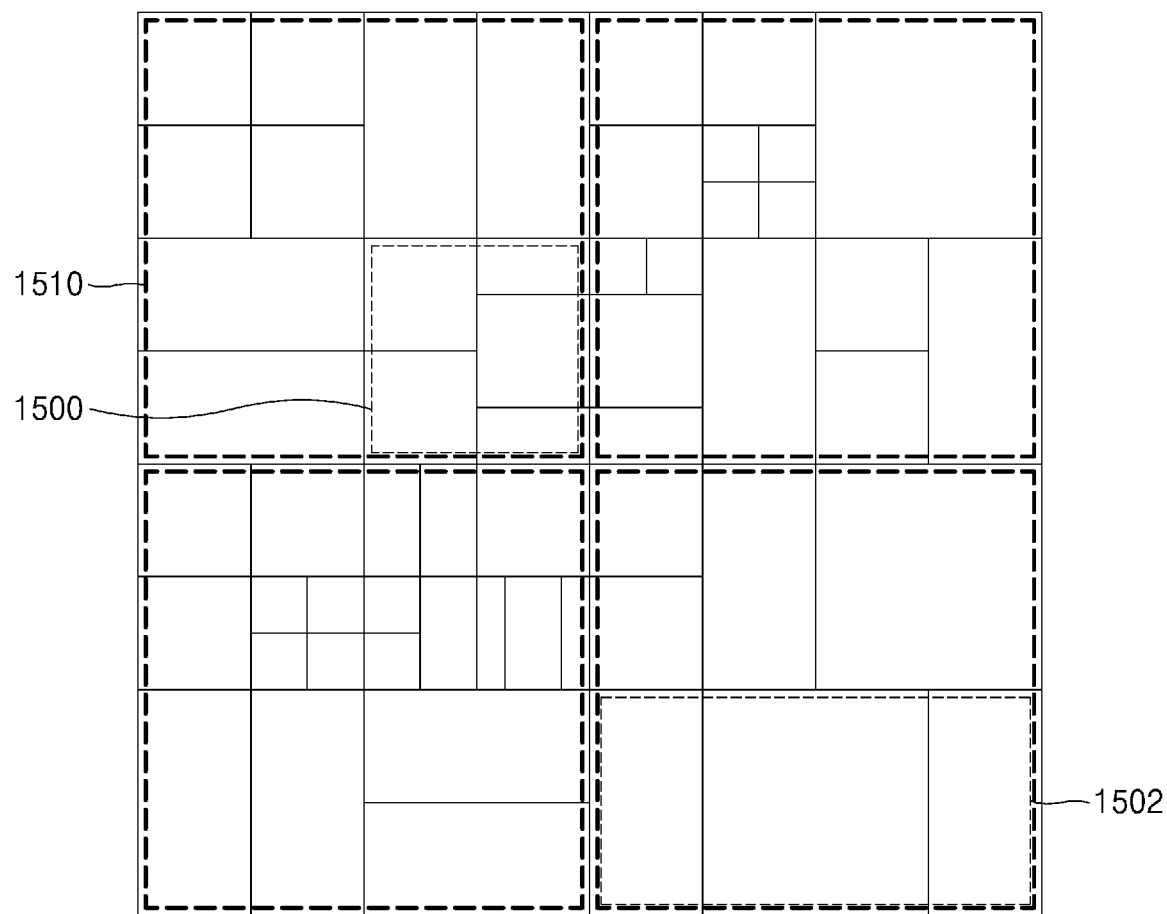
FIG. 15 illustrates that a plurality of coding units are determined based on a plurality of certain data units included in a picture, according to an embodiment.

FIG. 15 illustrates that a plurality of coding units are determined based on a plurality of certain data units included in a picture, according to an embodiment.

According to an embodiment, a certain data unit may be defined as a data unit where a coding unit starts to be recursively split by using split shape mode information. That is, the certain data unit may correspond to a coding unit of an uppermost depth, which is used to determine a plurality of coding units split from a current picture. In the following descriptions, for convenience of explanation, the certain data unit is referred to as a reference data unit.

According to an embodiment, the reference data unit may have a certain size and a certain size shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the smallest size allowed for the reference data units included in the current picture. Accordingly, the image decoding apparatus 100 may determine various reference data units having sizes equal to or greater than the smallest size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 110 of the image decoding apparatus 100 may obtain, from a bitstream, at least one of reference coding unit shape information or reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof are not provided again.

According to an embodiment, the image decoding apparatus 100 may use a PID for identifying the size and shape of reference coding units, to determine the size and shape of reference coding units according to some data units previously determined based on a certain condition. That is, the receiver 110 may obtain, from the bitstream, only the PID for identifying the size and shape of reference coding units with respect to each slice, slice segment, tile, tile group, or largest coding unit which is a data unit satisfying a predetermined condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the certain condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size or shape of reference coding units corresponding to the PID for identifying the size and shape of reference coding units may be previously determined. That is, the image decoding apparatus 100 may determine at least one of the size or shape of reference coding units included in a data unit serving as a unit for obtaining the PID, by selecting the previously determined at least one of the size or shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width or height of the largest coding unit may be integer times at least one of the width or height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information or the split shape mode information according to various embodiments.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure will be described in detail.

The image decoding apparatus 100 may determine a split rule of an image. The split rule may be pre-determined between the image decoding apparatus 100 and the image encoding apparatus 1900. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, or a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a height to width ratio, and a direction of the coding unit. The image decoding apparatus 100 may pre-determine to determine the split rule based on block shape information of a coding unit. However, the disclosure is not limited thereto. The image decoding apparatus 100 may determine the split rule of the image, based on information obtained from a received bitstream.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

A size of the coding unit may include various sizes, such as 4×4, 8×4, 4×8, 8×8, 16×4, 16×8, 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The height to width ratio of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined in the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, the disclosure is not limited thereto, and the coding units generated via different splitting paths have the same block shape. The coding units generated via the different splitting paths may have different decoding processing orders. Because the decoding processing orders have been described above with reference to FIG. 12, details thereof are not provided again.

Figure 16:
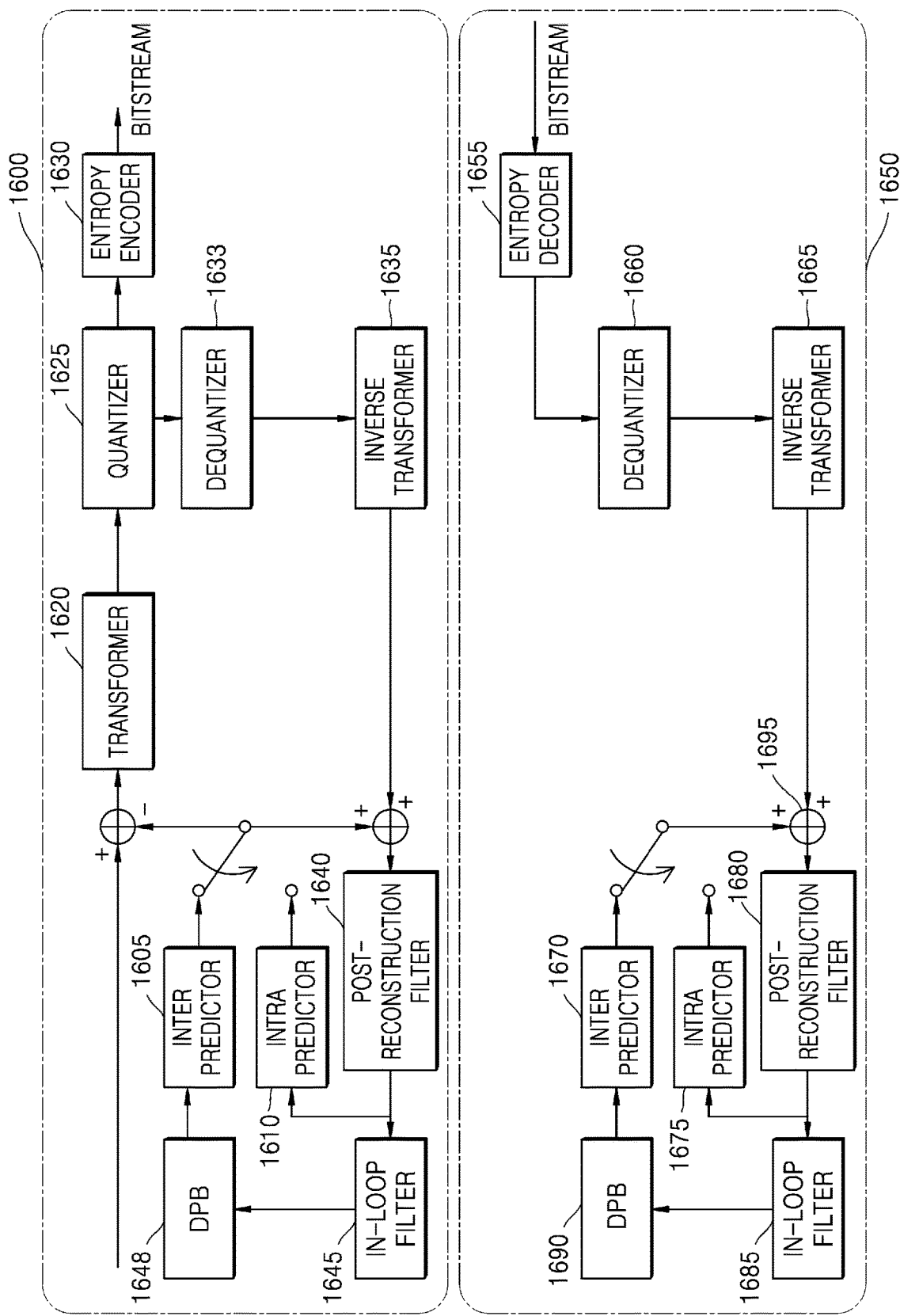
FIG. 16 is a block diagram of an image encoding and decoding system.

FIG. 16 is a block diagram of an image encoding and decoding system.

An entropy encoder 1630 of the image encoding and decoding system (1600) transmits an encoded bitstream of an image and a decoding device 1650 outputs a reconstructed image by receiving and decoding the bitstream. Here, the decoding device 1650 may have a similar configuration as the image decoding apparatus 100.

In an encoding end, an inter prediction encoder 1605 generates motion information of a current block indicating a reference block of a reference picture temporally adjacent to a current picture, when a prediction mode of a current block is an inter prediction mode. The inter prediction encoder 1605 may determine prediction samples of the current block by using samples of reference blocks. An intra prediction encoder 1610 may determine intra prediction information indicating a method of determining prediction samples or directions in which neighboring samples similar to the current block are located, such that the prediction samples of the current block are determined by using the neighboring samples spatially adjacent to the current block. The inter prediction encoder 1605 may determine, from among previously reconstructed samples stored in a decoded picture buffer (DPB) 1648, reference samples to be used to predict the current block.

A transformer 1620 outputs transform coefficients by performing transform on residual sample values obtained by subtracting prediction samples generated by the inter prediction encoder 1605 or intra prediction encoder 1610, from an original sample of the current block. A quantizer 1625 quantizes the transform coefficients output from the transformer 1620 and outputs the quantized transform coefficients. An entropy encoder 1630 may encode the quantized transform coefficients with residual syntax elements including a level value and output the same in a form of a bitstream.

The quantized transform coefficients output from the quantizer 1625 may be inverse-quantized and inverse-transformed via an inverse quantizer 1633 and an inverse transformer 1635, and thus the residual sample values may be generated again.

The residual sample values and the prediction sample values are added at an adder 1615, and thus reconstructed sample values are output. A post-reconstruction filter 1640 performs post-reconstruction filtering on reconstructed samples, and the reconstructed sample values updated via the post-reconstruction filtering may be used as reference sample values for intra prediction to be performed by the intra prediction encoder 1610. The post-reconstruction filter 1640 may perform Hadamard transform domain filtering or bilateral filtering on the reconstructed sample values.

An in-loop filter 1645 may perform at least one of deblocking filtering or adaptive loop filtering on the reconstructed samples updated via the post-reconstruction filtering. The reconstructed sample values updated via filtering of the in-loop filter 1645 may be stored in the DPB 1648, and may be used as reference sample values for inter prediction to be performed by the inter prediction encoder 1605.

An entropy decoder 1655 of the decoding device 1650 may perform entropy decoding on the received bitstream to parse the residual syntax elements including the level value. The quantized transform coefficients may be reconstructed from the residual syntax elements. An inverse quantizer 1660 may output the transform coefficients by performing inverse quantization on the quantized transform coefficients, and an inverse transformer 1665 may output the residual sample values by performing inverse transformation on the transform coefficients.

An inter prediction encoder 1670 of the decoding device 1650 may determine the reference picture temporally adjacent to the current picture by using the motion information of the current block parsed by the entropy decoder 1655, and determine the reference block in the reference picture. The inter prediction encoder 1670 may determine the prediction samples of the current block by using the samples of the reference blocks. An intra prediction encoder 1675 of the decoding device 1650 may determine the reference samples spatially adjacent to the current block by using the intra prediction information, by using the motion information of the current block parsed by the entropy decoder 1655, and determine the prediction samples of the current block by using the determined neighboring samples. The inter prediction encoder 1670 may determine, from among previously reconstructed samples stored in a DPB 1690, reference samples to be used to predict the current block.

The residual sample values and the prediction sample values are added at an adder 1695 of the decoding device 1650, and thus the reconstructed sample values of the current block are output. A post-reconstruction filter 1680 of the decoding device 1650 may perform Hadamard transform domain filtering or bilateral filtering on the reconstructed sample values. The reconstructed sample values updated via filtering of the post-reconstruction filter 1680 may be used as reference sample values for intra prediction to be performed by the intra prediction encoder 1675.

An in-loop filter 1685 of the decoding device 1650 may perform at least one of deblocking filtering or adaptive loop filtering on the reconstructed samples updated via the post-reconstruction filtering. The reconstructed sample values updated via the filtering of the in-loop filter 1685 may be stored in the DPB 1690, and may be used as reference sample values for inter prediction to be performed by the inter prediction encoder 1670.

Video encoding and decoding methods, and video encoding and decoding apparatuses, according to an embodiment, propose a method of performing quantization or inverse quantization, based on a data unit determined by the video encoding apparatus and video decoding apparatus described with reference to FIGS. 1 through 16 above. Hereinafter, a video encoding method and apparatus or a video decoding method and apparatus for performing quantization or inverse quantization by determining a quantization parameter (QP), according to an embodiment of the disclosure, will be described with reference to FIGS. 17 through 40.

Figure 17:
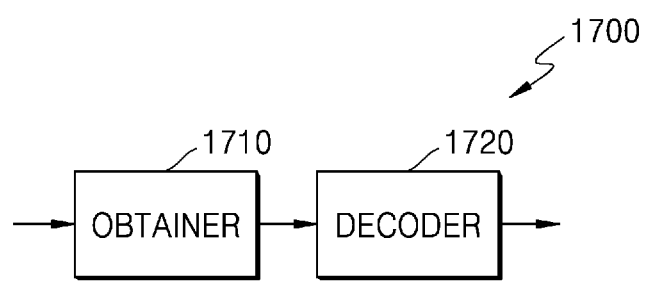
FIG. 17 is a block diagram of a video decoding apparatus according to an embodiment.

FIG. 17 is a block diagram of a video decoding apparatus according to an embodiment.

A video decoding apparatus 1700 according to an embodiment includes an obtainer 1710 and a decoder 1720. The video decoding apparatus 1700 may obtain a bitstream generated as a result of encoding an image, determine locations of blocks split from a picture, based on information included in the bitstream, and decode the blocks, such as a largest coding unit and a coding unit.

The video decoding apparatus 1700 may include at least one data storage (not shown) storing input and output data of the obtainer 1710 and the decoder 1720. The video decoding apparatus 1700 may include a memory controller (not shown) for controlling data input and output of the data storage.

The video decoding apparatus 1700 may perform an image decoding operation including prediction by connectively operating with an internal video decoding processor or an external video decoding processor so as to reconstruct an image via image decoding. The internal video decoding processor of the video decoding apparatus 1700 according to an embodiment may perform a basic image decoding operation as a separate processor, or a central processing apparatus or a graphic processing apparatus, including an image decoding processing module, may perform a basic image decoding operation.

The video decoding apparatus 1700 may be included in the image decoding apparatus 100 described above. For example, the obtainer 1710 and the decoder 1720 may correspond to the decoder 120 of the image decoding apparatus 100. The video decoding apparatus 1700 may correspond to the decoding device 1650 of the image encoding and decoding system described above with reference to FIG. 16. For example, the decoder 1720 may include functions of the inverse quantizer 1633 of the decoding device 1650.

The video decoding apparatus 1700 receives the bitstream generated as the result of encoding the image. The bitstream may include information about a current picture. A picture may include one or more largest coding units. The video decoding apparatus 1700 may determine a location of a current block in the picture, based on the information obtained from the bitstream. The current block is a block generated when the picture is split according to a tree structure, and for example, may correspond to a largest coding unit or a coding unit. The video decoding apparatus 1700 determines whether to further split the current block into subblocks of lower depths, and may determine the tree structure of the current block. The lower depth may be determined by adding the number of splits from the current block to the subblocks to a current depth of the current block. Among blocks forming the tree structure included in the current picture, blocks located at tree leaves are blocks that are no longer split. Accordingly, the video decoding apparatus 1700 may decode one or more blocks that are no longer split by performing inverse quantization, inverse transformation, and prediction on the blocks.

The video decoding apparatus 1700 may generate prediction samples of the current block by performing prediction on the current block. The video decoding apparatus 1700 may generate residual samples of the current block by performing inverse transformation on the current block. A reconstructor 1730 may generate reconstructed samples of the current block by using the prediction samples of the current block and the residual samples of the current block. The video decoding apparatus 1700 may reconstruct the current picture by reconstructing samples for each block.

For example, when the prediction mode of the current block is an intra mode, the video decoding apparatus 1700 may determine a reference sample among samples of a spatial neighboring block located in an intra prediction direction, by using intra prediction information of the current block, and determine prediction samples corresponding to the current block, by using the reference sample.

For example, when the prediction mode of the current block is an inter mode, the video decoding apparatus 1700 may reconstruct the current block by using a motion vector of the current block. The video decoding apparatus 1700 may determine a reference block in a reference picture by using the motion vector of the current block, and determine the prediction samples corresponding to the current block from reference samples included in the reference block. The video decoding apparatus 1700 may reconstruct transform coefficients by using a transform coefficient level obtained from the bitstream, and reconstruct residual samples by performing inverse quantization and inverse transformation on the transform coefficients. The video decoding apparatus 1700 may determine the reconstructed samples of the current block by combining the prediction samples and residual samples corresponding to the current block.

When the current block is predicted in a skip mode, the video decoding apparatus 1700 may not need to parse the transform coefficients of the current block from the bitstream. The video decoding apparatus 1700 may determine the reconstructed samples of the current block by using the prediction samples of the current block as they are.

The video decoding apparatus 1700 according to an embodiment uses a quantization parameter (QP) to perform the inverse quantization. The QP is set for each coding unit, and one QP may be applied to the transform coefficients included in the coding unit. The picture may include one or more slices, and one slice may include one or more coding units. To determine the QP for each coding unit, the video decoding apparatus 1700 may obtain, from the bitstream, pieces of information required to determine a QP for each coding unit, each slice, or each picture.

The obtainer 1710 according to an embodiment may obtain, from a coding unit-related bitstream syntax, the information required to determine the QP for each coding unit. The obtainer 1710 may obtain, from a slice header syntax, the information required to determine the QP for each slice. The obtainer 1710 may obtain, from a picture header syntax, the information required to determine the QP for each picture.

First, the video decoding apparatus 1700 may determine whether to obtain a QP difference value for each picture or obtain a QP difference value for each slice, in a picture parameter set level.

The obtainer 1710 according to an embodiment may obtain, from a picture parameter set, a QP initial value to be applied to the current picture. Also, the obtainer 1710 may obtain, from the picture parameter set, picture header QP difference value information, e.g., QP difference value flag, indicating whether QP difference value information is present in a picture header of the current picture. When the picture header QP difference value information indicates that the QP difference value information is present in the picture header, the obtainer 1710 may obtain, from the picture header, a first QP difference value for the current picture. When the picture header QP difference value information indicates that the QP difference value information is not present in the picture header, the obtainer 1710 may obtain a second QP difference value for a current slice, from a slice header of the current slice included in the current picture.

When the picture header QP difference value information indicates that the QP difference value information is present in the picture header, the decoder 1720 according to an embodiment may determine a QP for a coding unit included in the current picture by using the QP initial value and the first QP difference value. The decoder 1720 may perform the inverse quantization on the coding units included in the current picture by using the QP determined by using the first QP difference value.

When the picture header QP difference value information indicates that the QP difference value information is not present in the picture header, the decoder 1720 may determine a QP for a coding unit included in the current slice by using the QP initial value and the second QP difference value. The decoder 1720 may perform the inverse quantization on the coding units included in the current slice by using the QP determined by using the second QP difference value.

Hereinafter, processes by which the video decoding apparatus 1700 performs the inverse quantization for each coding unit by obtaining the QP difference value information for each picture or each slice will be described with reference to FIG. 18.

Figure 18:
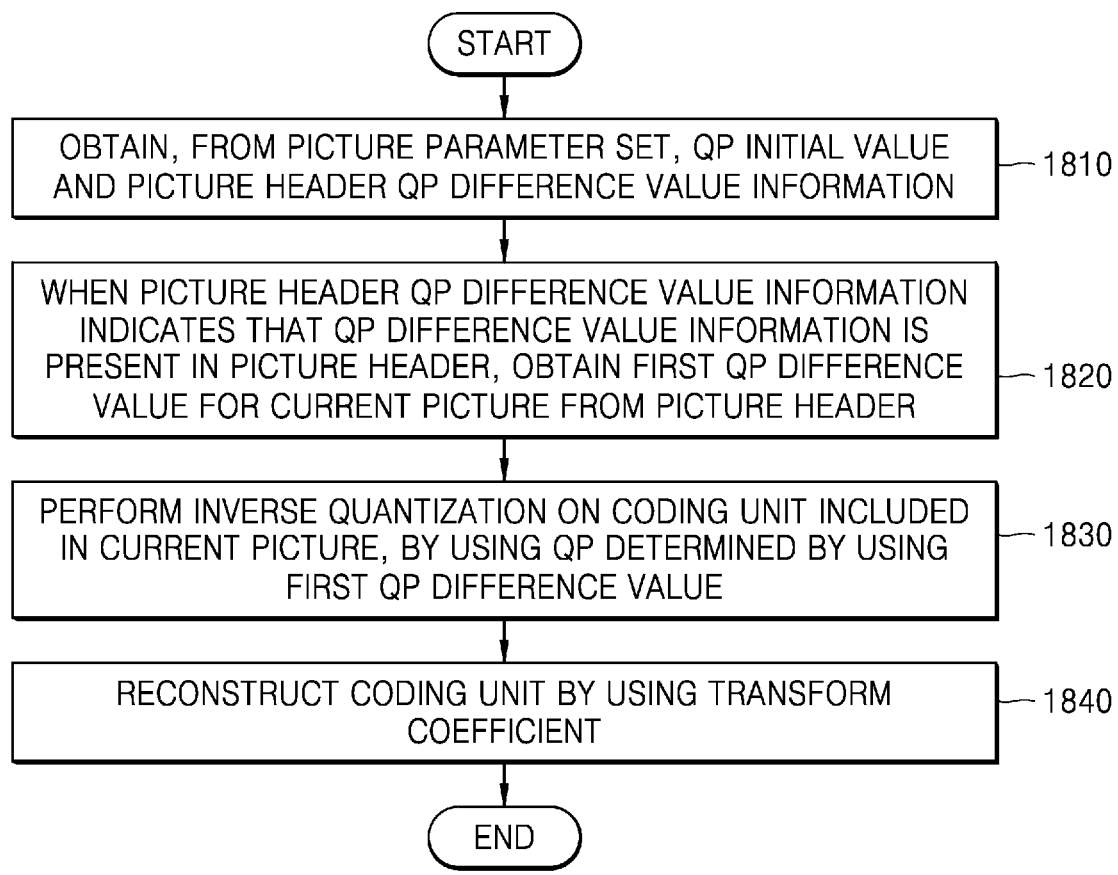
FIG. 18 is a flowchart of a video decoding method according to an embodiment.

FIG. 18 is a flowchart of a video decoding method according to an embodiment.

In operation 1810, the obtainer 1710 may obtain, from a picture parameter set, picture header QP difference value information and QP initial value to be applied to a current picture. The picture header QP difference value information according to an embodiment may indicate whether QP difference value information is present in a picture header of the current picture.

In operation 1820, when the picture header QP difference value information indicates that the QP difference value information is present in the picture header of the current picture, the obtainer 1710 may obtain, from the picture header, a first QP difference value for the current picture.

In operation 1830, the decoder 1720 may determine a QP for a coding unit included in the current picture by using the QP initial value and the first QP difference value.

In operation 1840, the decoder 1720 may obtain a transform coefficient of the coding unit by performing inverse quantization on the coding unit, by using the QP determined by using the first QP difference value. In other words, the inverse quantization may be performed on the coding units included in the current picture by using the QP determined by using the first QP difference value.

In operation 1850, the decoder 1720 may reconstruct the coding unit by using the transform coefficient of the coding unit obtained in operation 1840. The decoder 1720 may obtain residual samples by performing inverse transformation on the transform coefficient, and determine reconstructed samples of the coding unit by using the residual samples.

According to an embodiment, when the picture header QP difference value information indicates that the QP difference value information is not present in the picture header, the obtainer 1710 may obtain a second QP difference value for a current slice, from a slice header of the current slice included in the current picture. The decoder 1720 may determine a QP for a coding unit included in the current slice by using the QP initial value and the second QP difference value. The decoder 1720 may obtain transform coefficients of the coding unit by performing inverse quantization on the coding unit, by using the QP determined by using the second QP difference value. The decoder 1720 may reconstruct the coding unit by using the transform coefficients. In other words, the inverse quantization may be performed on the coding units included in the current slice by using the QP determined by using the second QP difference value.

In operation 1820, when the picture header QP difference value information indicates that the QP difference value information is present in the picture header of the current picture, the obtainer 1710 may obtain, from the picture header, the first QP difference value for a luma component of the current picture. The decoder 1720 may determine a QP for a luma component of slices included in the current picture by adding the QP initial value and the first QP difference value for the luma component. The decoder 1720 may determine a QP of a coding unit included in the slices included in the current picture, by using the QP for the luma component of the slices.

In operation 1820, the obtainer 1710 may obtain, from the bitstream, a QP difference value for the coding unit. The decoder 1720 may determine a QP for a luma component of the coding unit by using the QP for the luma component of the slices and the QP difference value for the coding unit. The decoder 1720 may perform inverse quantization on the transform coefficients included in the coding unit, by using the QP for the coding unit. The residual samples of the coding unit may be decoded by performing inverse transformation on the inverse-quantized transform coefficients.

The obtainer 1710 according to another embodiment may not obtain, from the bitstream, the QP difference value for the coding unit. In this case, the decoder 1720 may determine the QP for the luma component of the coding unit by using a QP prediction value predicted for the coding unit.

According to an embodiment, when the picture header QP difference value information indicates that the QP difference value information is not present in the picture header of the current picture, the obtainer 1710 may obtain, from the slice header, the second QP difference value for a luma component of the current slice. The decoder 1720 may determine the QP for the luma component of the current slice by adding the QP initial value and the second QP difference value for the luma component. The decoder 1720 may determine the QP of the coding unit included in the current slice by using the QP for the luma component of the current slice. The decoder 1720 may perform inverse quantization on the transform coefficients included in the coding unit, by using the QP for the coding unit. The residual samples of the coding unit may be decoded by performing the inverse transformation on the inverse-quantized transform coefficients. When the picture header QP difference value information indicates that the QP difference value information is not present in the picture header of the current picture, the obtainer 1710 may obtain, from the bitstream, the QP difference value for the coding unit included in the current slice. The decoder 1720 may determine a QP for a luma component of a current coding unit included in the current slice by using the QP difference value for the coding unit.

When the picture header QP difference value information indicates that the QP difference value information is not present in the picture header of the current picture, the obtainer 1710 may obtain, from the slice header, a Cb QP difference value for a Cb chroma component of the current slice and a Cr QP difference value for a Cr chroma component of the current slice. The decoder 1720 may determine a Cb QP for a Cb chroma component of the current coding unit included in the current slice by updating a QP for a Cb chroma component of the current coding unit by using the Cb QP difference value for the Cb chroma component of the current slice. The decoder 1720 may determine a Cr QP for a Cr chroma component of the current coding unit included in the current slice by updating a QP for a Cr chroma component of the current coding unit by using the Cr QP difference value for the Cb chroma component of the current slice.

Figure 19:
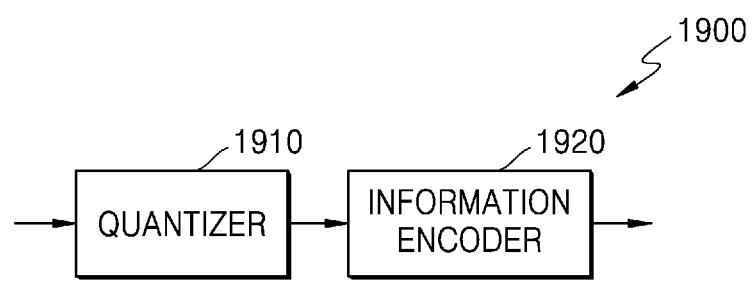
FIG. 19 is a block diagram of a video encoding apparatus according to an embodiment.

FIG. 19 is a block diagram of a video encoding apparatus according to an embodiment.

Referring to FIG. 19, a video encoding apparatus 1900, or an image encoding apparatus 1900, according to an embodiment may include a quantizer 1910 and an information encoder 1920.

The video encoding apparatus 1900 according to an embodiment may include a central processor (not shown) for controlling the quantizer 1910 and the information encoder 1920. Alternatively, the quantizer 1910 and the information encoder 1920 may operate respectively by their own processors (not shown), and the processors may operate systematically such that the video encoding apparatus 1900 operates as a whole. Alternatively, the quantizer 1910 and the information encoder 1920 may be controlled under control of an external processor (not shown) of the video encoding apparatus 1900.

The video encoding apparatus 1900 may include at least one data storage (not shown) storing input and output data of the quantizer 1910 and the information encoder 1920. The video encoding apparatus 1900 may include a memory controller (not shown) for controlling data input and output of the data storage.

The video encoding apparatus 1900 may perform an image encoding operation including prediction by connectively operating with an internal video encoding processor or an external video encoding processor so as to encode an image. The internal video encoding processor of the video encoding apparatus 1900 according to an embodiment perform a basic image encoding operation as a separate processor, or a central processing apparatus or a graphic processing apparatus, including an image encoding processing module, may perform a basic image decoding operation.

The video encoding apparatus 1900 may correspond to the encoding device 1600 of the image encoding and decoding system described above with reference to FIG. 16. For example, the information encoder 1920 may correspond to the entropy encoder 1630 of the encoding device 1600. The quantizer 1910 may correspond to the quantizer 1625 of the encoding device 1600.

The video encoding apparatus 1900 according to an embodiment may split a picture into a plurality of largest coding units, and split each largest coding unit into blocks having various sizes and various shapes for encoding.

For example, when a prediction mode of a current block is an intra mode, the video encoding apparatus 1900 may determine a reference sample among samples of a spatial neighboring block located in an intra prediction direction, by using intra prediction information of the current block, and determine prediction samples of the current block, by using the reference sample. Residual samples that are differences between the prediction samples and samples of the current block may be determined, transform coefficients may be generated by converting the residual samples based on transform blocks, and quantized transform coefficients may be generated by performing quantization on the transform coefficients.

For example, when the current block is predicted in a skip mode, the video encoding apparatus 1900 may determine a motion vector for predicting the current block. The video encoding apparatus 1900 may determine a reference block of the current block from a reference picture, and determine a motion vector indicating the reference block from the current block. In the skip mode, a residual block may not need to be encoded.

For example, when the prediction mode of the current block is an inter mode, the video encoding apparatus 1900 may determine the motion vector to predict the current block. The video encoding apparatus 1900 may determine the reference block of the current block from the reference picture, and determine the motion vector indicating the reference block from the current block. The video encoding apparatus 1900 may determine prediction samples of the current block by using reference samples included in the reference block, determine the residual samples that are differences between the prediction samples and the samples of the current block, and generate the quantized transform coefficients by performing transformation and quantization on the residual samples based on the transform blocks.

The current block is a block generated when an image is split according to a tree structure, and for example, may correspond to a largest coding unit, a coding unit, or a transform unit. The video encoding apparatus 1900 may encode the blocks included in the picture according to an encoding order.

The video encoding apparatus 1900 according to an embodiment uses a QP to perform the quantization. The QP is set for each coding unit, and one QP may be applied to the transform coefficients included in the coding unit. The picture may include one or more slices, and one slice may include one or more coding units. The video encoding apparatus 1900 may determine the QP for each coding unit, and encode, for signaling, pieces of information required to determine a QP for each coding unit, each slice, or each picture.

The information encoder 1920 according to an embodiment may encode the information required to determine the QP for each coding unit, and output the same in a form of a coding unit-related bitstream syntax. The information encoder 1920 may encode the information required to determine the QP for each slice, and output the same in a form of a slice header syntax. The information encoder 1920 may encode the information required to determine the QP for each picture, and output the same in a form of a picture header syntax.

First, the video encoding apparatus 1900 may determine whether to transmit a QP difference value for each picture or transmit a QP difference value for each slice, in a picture parameter set level.

The quantizer 1910 according to an embodiment may determine a QP initial value to be applied to the current picture.

When the QP difference value is determined for each picture, the information encoder 1920 may determine a first QP difference value between the QP initial value and a QP used in the current picture. The information encoder 1920 may generate a picture header for the current picture including the first QP difference value.

When the QP difference value is determined for each slice, the information encoder 1920 may determine a second QP difference value between the QP initial value and a QP used in a current slice included in the current picture. The information encoder 1920 may generate a slice header for the current slice, the slice header including the second QP difference value.

The information encoder 1920 according to an embodiment may generate a picture parameter set including the QP initial value and picture header QP difference value information indicating whether QP difference value information is present in the picture header of the current picture.

Hereinafter, processes by which the video encoding apparatus 1900 signals the QP difference value information for each picture or each slice will be described with reference to FIG. 20.

Figure 20:
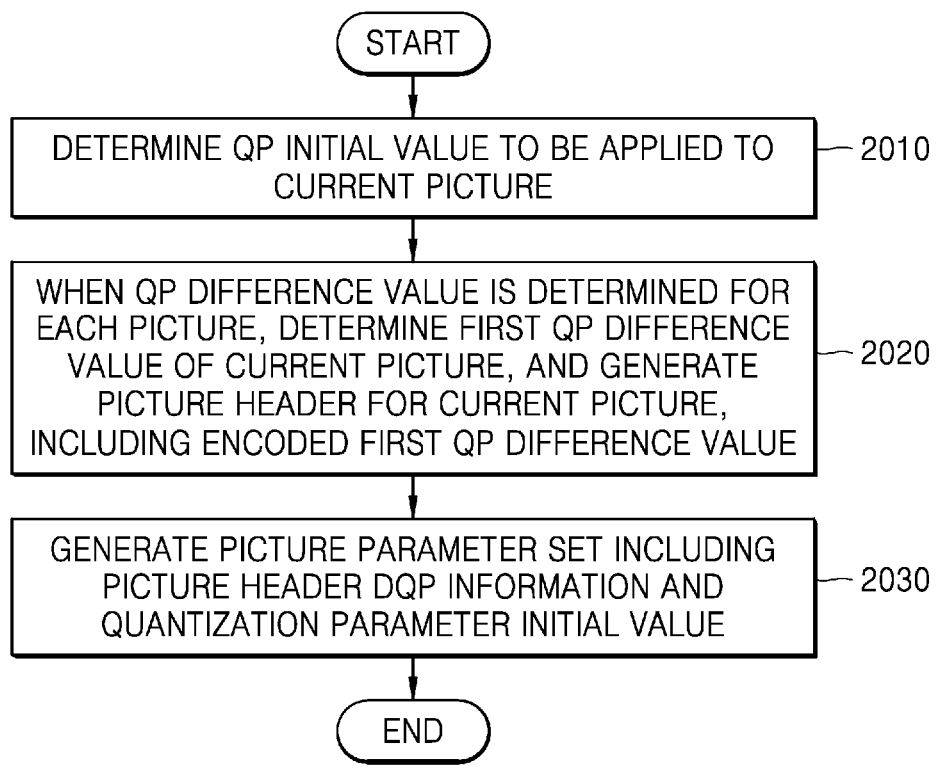
FIG. 20 is a flowchart of a video encoding method according to an embodiment.

FIG. 20 is a flowchart of a video encoding method according to an embodiment.

In operation 2010, the quantizer 1910 may determine a QP initial value to be applied to a current picture.

In operation 2020, when a QP difference value is determined for each picture, the information encoder 1920 may determine a first QP difference value between the QP initial value and a QP used in the current picture, and generate a picture header for the current picture, the picture header including the first QP difference value.

In operation 2030, the information encoder 1920 may generate a picture parameter set including the QP initial value and picture header QP difference value information indicating whether QP difference value information is present in the picture header of the current picture.

According to an embodiment, when the QP difference value is determined for each slice, the information encoder 1920 may determine a second QP difference value between the QP initial value and a QP used in a current slice included in the current picture, and generate a slice header for the current slice, the slice header including the second QP difference value.

In operation 2020, when the QP difference value is determined for each picture, the quantizer 1910 may determine a QP for a luma component of slices included in the current picture. The information encoder 1920 may determine the first QP difference value for a luma component of the current picture by using a difference value between the QP initial value and the QP for the luma component of the slices included in the current picture. The information encoder 1920 may determine a QP difference value for a coding unit by using a difference value between the QP for the luma component of the slices and a QP for a luma component of the coding unit. The information encoder 1920 may encode the QP difference value for the coding unit.

In operation 2030, when the QP difference value is determined for each slice, the quantizer 1910 may determine a QP for a luma component of a current slice. The information encoder 1920 may determine a second QP difference value for the luma component of the current slice by using a difference value between the QP initial value and the QP for the luma component of the current slice. The information encoder 1920 may determine a QP difference value for a coding unit by subtracting the QP for the luma component of the current slice from the QP for the luma component of the coding unit. The information encoder 1920 may encode the QP difference value for the coding unit.

The quantizer 1910 according to another embodiment may determine the QP for the luma component of the coding unit by using a QP prediction value predicted for the coding unit, and perform quantization on the coding unit by using the QP. In this case, the information encoder 1920 may not encode the QP difference value for the coding unit.

In operation 2030, when the QP difference value is encoded for each slice, the information encoder 1920 may determine a Cb QP difference value for a Cb chroma component of the current slice, the Cb QP difference value for determining a QP of the Cb chroma component of the coding unit included in the current slice. Also, the information encoder 1920 may determine a Cr QP difference value for a Cr chroma component of the current slice, the Cr QP difference value for determining a QP of the Cr chroma component of the coding unit included in the current slice. The information encoder 1920 may encode the Cb QP difference value of the current slice and the Cr QP difference value for the Cr chroma component, and generate a slice header for the current slice, including the Cb QP difference value and the Cr QP difference value.

The quantizer 1910 may generate quantized transform coefficients of the coding unit by performing quantization on the transform coefficient of the coding unit by using the QP. The information encoder 1920 may generate a bitstream by performing entropy encoding on pieces of information about the quantized transform coefficients.

The video decoding apparatus 1700 according to an embodiment and the video encoding apparatus 1900 according to an embodiment may selectively signal the QP difference value for each picture or each slice. Accordingly, the video encoding apparatus 1900 according to an embodiment may determine whether to signal the QP difference value for each picture or signal the QP difference value for each slice, according to a data transmission efficiency or characteristic of a data picture, and signal the QP difference value according to a method having high transmission efficiency. The video decoding apparatus 1700 according to an embodiment may determine whether to obtain the QP difference value for each picture or obtain the QP difference value for each slice, based on information obtained from the picture parameter set, and determine a QP for each picture or a QP for each slice. Accordingly, when the QP difference value is signaled for each picture, the QP difference value is not required to be signaled for each slice included in the picture, and thus the amount of data for signaling a QP may be reduced.

Figure 21:
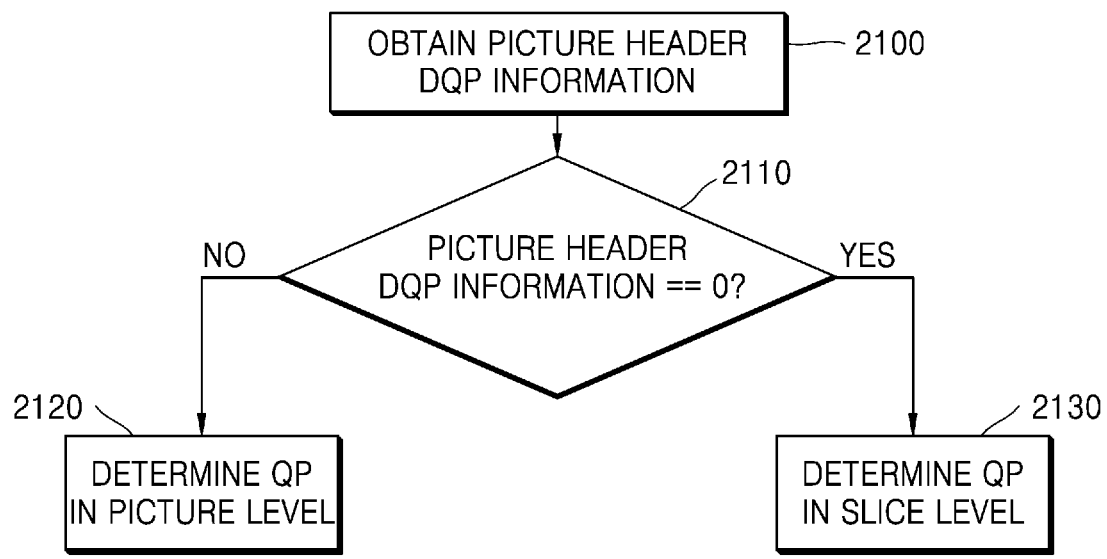
FIG. 21 is an overview diagram for inducing a quantization parameter (QP) in a picture level or slice level, according to an embodiment.

FIG. 21 is an overview diagram for inducing a QP in a picture level or slice level, according to an embodiment.

In a general video codec, a QP initial value is generally configured in a picture parameter set (PPS) and a difference value of QP initial values of slices is transmitted through a slice header, and thus a QP is configured for each slice.

On the other hand, the video decoding apparatus 1700 according to an embodiment may obtain a picture header for each picture and signal information about a QP from the picture header. In the disclosure, it is selected whether to signal a QP difference value for each picture or signal a QP difference value for each slice between the video decoding apparatus 1700 and the video encoding apparatus 1900, and thus a signaling structure of a QP may be simplified.

First, in operation 2100, the video decoding apparatus 1700 may obtain a QP initial value from a sequence parameter set (SPS) or PPS that is a higher level of a picture header. Also, in operation 2110, the video decoding apparatus 1700 may obtain picture header QP difference value (dQP) information from the PPS or SPS. The video decoding apparatus 1700 may determine whether to determine a QP in a picture level or determine a QP in a slice level, according to the picture header dQP information.

In detail, when the picture header dQP information is not 0 (for example, when the picture header dQP information is 1), i.e., when a QP difference value (delta value) is present in the picture header, the video decoding apparatus 1700 may obtain the QP difference value from the picture header in operation 2120. The video decoding apparatus 1700 may determine a QP for each picture by using the QP difference value obtained from the picture header and the QP initial value obtained from the PPS or SPS.

When the picture header dQP information is 0, i.e., when the QP difference value is not present in the picture header, the video decoding apparatus 1700 may obtain the QP difference value from a slice header, in operation 2130. The video decoding apparatus 1700 may determine a QP for each slice by using the QP difference value obtained from the slice header and the QP initial value obtained from the PPS or SPS.

For operations 2100 through 2130 of the video decoding apparatus 1700, the video encoding apparatus 1900 may determine whether to determine the QP in the picture level or slice level. Also, the video encoding apparatus 1900 may encode the picture header dQP information indicating whether to determine the QP in the picture level or determine the QP in the slice level.

In detail, when the QP is determined for each picture, the video encoding apparatus 1900 may encode the QP difference value for each picture. Accordingly, the video encoding apparatus 1900 may generate a picture header of a current picture including a QP difference value of the current picture. In this case, the picture header dQP information may be encoded to indicate 1 such as to indicate that the QP difference value is present in the picture header of the current picture.

When the QP is determined for each slice, the video encoding apparatus 1900 may encode the QP difference value for each slice. Accordingly, the video encoding apparatus 1900 may generate a slice header of a current slice including a QP difference value of the current slice. In this case, the picture header dQP information may be encoded to indicate 0 such as to indicate that the QP difference value is not present in the picture header.

The video encoding apparatus 1900 according to an embodiment may generate the PPS or SPS including the QP initial value and picture header dQP information.

As described above, when a same QP is configured for coding units included in the current picture in the picture level, the QP is signaled only from the picture header, and thus the number of bits for signaling the QP may be reduced. In other words, the QP difference value may be signaled once only from the picture header of the current picture, without having to signal the QP through a slice header for each slice included in the current picture. When characteristics of the slices included in the current picture are different from each other, the QP may be separately configured for each slice to configure the QP in further detail, and the QP difference value may be signaled to each slice for each slice header.

Hereinafter, syntax structures for signaling picture header dQP information will be described with reference to FIGS. 22 through 24.

FIG. 22 illustrates a picture parameter set including picture header dQP information, according to an embodiment.

The video encoding apparatus 1900 may include syntax elements pps_init_qp_minus26 2210 and pps_qp_delta_info_in_ph_flag 2220 to a picture parameter set syntax 2200. The syntax element pps_qp_delta_info_in_ph_flag 2220, i.e., QP difference value flag, may indicate whether a QP difference value for a current picture is present in a picture header of the current picture.

The video decoding apparatus 1700 may parse the syntax elements pps_init_qp_minus26 2210 and pps_qp_delta_info_in_ph_flag 2220 from the picture parameter set syntax 2200. The video decoding apparatus 1700 may obtain, from the syntax element pps_init_qp_minus26 2210, a QP initial value applicable to the current picture or slices included in the current picture. The video decoding apparatus 1700 may identify, from the syntax element pps_qp_delta_info_in_ph_ flag 2220, whether the QP difference value for the current picture is present in the picture header of the current picture.

The syntax element pps_init_qp_minus26 2210 may indicate an initial value of QP SliceQpY applicable to the current picture or the slices included in the current picture. When a QP difference value ph_qp_delta of a picture is decoded to a value that is not 0 in the picture header, the initial value of SliceQpY may be adjusted by using the QP difference value in a picture level. When a QP difference value sh_qp_delta of a slice is decoded to a value that is not 0 in a slice header, the initial value of SliceQpY may be adjusted by using the QP difference value in a slice level. A value of pps_init_qp_minus26 2210 may be within a range from −(26+QpBdOffset) to +37. QpBdOffset may be determined according to a bit depth. SliceQpY may be determined according to following equations depending on whether ph_qp_delta or sh_qp_delta is decoded.

$$Slice QpY=26+pps\_init\_qp\_minus26+ph\_qp\_delta$$

$$Slice QpY=26+pps\_init\_qp\_minus26+sh\_qp\_delta$$

Accordingly, QP SliceQpY of a luma component of a slice may be determined within a range from −QpBdOffset to +63.

FIG. 23 illustrates a picture header including a QP difference value of a current picture, according to an embodiment.

The video encoding apparatus 1900 may include a syntax element ph_qp_delta 2320 to a picture header syntax 2300. The syntax element ph_qp_delta 2320 may indicate a QP difference value applicable to a current picture. In detail, when the pps_qp_delta_info_in_ph_flag 2220 included in the PPS 2200 indicates 1 (2310), the syntax element ph_qp_delta 2320 may be included in the picture header syntax 2300.

The video decoding apparatus 1700 may obtain the syntax element ph_qp_delta 2320 from the picture header syntax 2300. In detail, when the pps_qp_delta_info_in_ph_flag 2220 obtained from the PPS 2200 indicates 1 (2310), the syntax element ph_qp_delta 2320 may be obtained from the picture header syntax 2300. In this case, a QP of the picture may be determined by adding the syntax elements pps_init_qp_minus26 2210 and ph_qp_delta 2320 for the current picture corresponding to the picture header syntax 2300. The QP of the picture may be applied to all coding units included in the current picture. When a QP difference value of a coding unit is obtained from a syntax structure corresponding to each coding unit, a QP of the coding unit may be determined by adding the QP difference value of the coding unit and the QP of the picture. The video decoding apparatus 1700 may perform inverse quantization on transform samples of the coding unit, by using the QP for each coding unit.

FIG. 24 illustrates a slice header including a QP difference value of a current slice, according to an embodiment.

The video encoding apparatus 1900 may include a syntax element sh_qp_delta 2420 to a slice header syntax 2400. The syntax element sh_qp_delta 2420 may indicate a QP difference value of a luma component applicable to a current slice. In detail, when the pps_qp_delta_info_in_ph_flag 2220 included in the PPS 2200 indicates 0 (2410), the syntax element sh_qp_delta 2420 may be included in the slice header syntax 2400. Also, the video encoding apparatus 1900 may include syntax elements sh_cb_qp_offset and sh_cr_qp_offset 2430 to the slice header syntax 2400. The syntax elements sh_cb_qp_offset and sh_cr_qp_offset 2430 respectively indicate a QP difference value of a chroma Cb component and a QP difference value of a chroma Cr component.

The video decoding apparatus 1700 may obtain the syntax element sh_qp_delta 2420 from the slice header syntax 2400. In detail, when the pps_qp_delta_info_in_ph_flag 2220 obtained from the PPS 2200 indicates 0 (2410), the syntax element sh_qp_delta 2420 may be obtained from the slice header syntax 2400. In this case, a QP of the luma component of the slice may be determined by adding the syntax elements pps_init_qp_minus26 2210 and sh_qp_delta 2420 for the current slice corresponding to the slice header syntax 2400. The QP of the luma component of the slice may be applied to all coding units included in the current slice. When a QP difference value of a luma component of the coding unit is obtained from a syntax structure corresponding to each coding unit, a QP of the luma component of the coding unit may be determined by adding the QP difference value of the luma component of the coding unit and the QP of the luma component of the slice.

Also, the video decoding apparatus 1700 may parse the syntax elements sh_cb_qp_offset and sh_cr_qp_offset 2430 from the slice header syntax 2400. The QP difference value of the chroma Cb component and the QP difference value of the chroma Cr component may be respectively obtained from the syntax elements sh_cb_qp_offset and sh_cr_qp_offset 2430. Accordingly, the video decoding apparatus 1700 may determine a QP for chroma Cb components of the coding units included in the current slice by using the QP difference value of the chroma Cb component, and determine a QP for chroma Cr components of the coding unit included in the current slice by using the QP difference value of the chroma Cr component. The video decoding apparatus 1700 may perform inverse quantization on transform samples of the coding unit, by using the QP for each coding unit.

The sh_cb_qp_offset and sh_cr_qp_offset 2430 may each have a value in a range between −12 and 12.

An offset of QP of a Cb component in the slice may be determined by pps_cb_qp_offset+sh_cb_qp_offset, and a value of pps_cb_qp_offset+sh_cb_qp_offset may be determined within a range from −12 to +12. Similarly, an offset of QP of a Cr component in the slice may be determined by pps_cr_qp_offset+sh_cr_qp_offset, and a value of pps_cr_qp_offset+sh_cr_qp_offset may be determined within a range from −12 to +12.

In addition, when a QP difference value (delta QP) is signaled in a coding unit level, a QP determined in beginning of tiles, beginning of slices, picture header, or slice header may be used as a QP initial value. For example, when a QP is determined in a picture header and there are slices or tiles in a picture, the QP determined in the picture header in beginning of the slices or tiles may be used as a QP initial value. Accordingly, a QP of a coding unit may be determined by adding the QP difference value of the coding unit signaled in the coding unit level and the QP initial value determined in the beginning of tiles or slices.

As another example, when signaling a picture order counter (POC), POC information may be included only in a picture header and not in a slice header. In this case, it may be difficult to identify to which picture a specific slice belongs. However, an index of a picture to which a slice belongs is identified by using a timestamp or sequence number to be signaled in a system level. Also, a loss of information on the specific slice or picture header may be determined by receiving a notification from an external system of a codec.

According to a video encoding method and a video decoding method, according to an embodiment, a method of transmitting a difference value of a QP may be determined according to a data transmission efficiency or a characteristic of a picture, and the difference value of the QP may be signaled according to the method.

Hereinafter, syntax structures for selectively signaling, in a picture level or slice level, parameters available in various tools will be described with reference to FIGS. 25 through 32. It may be determined whether a tool-related parameter is to be signaled from a picture header or from a slice header, through a flag signaled from a picture sequence set.

FIG. 25 illustrates a picture parameter set including information indicating whether a picture header includes a deblocking filter-related parameter, according to an embodiment.

The video encoding apparatus 1900 may include pps_dbf_info_in_ph_flag 2510 to a picture parameter set syntax 2500. The syntax element pps_dbf_info_in_ph_flag 2510 may indicate whether a deblocking filter-related parameter difference value for a current picture is present in a picture header of the current picture.

The video decoding apparatus 1700 may parse the pps_dbf_info_in_ph_flag 2510 from the picture parameter set syntax 2500. The video decoding apparatus 1700 may identify, from the syntax element pps_dbf_info_in_ph_flag 2510, whether a deblocking filter-related parameter for the current picture is present in the current picture header.

FIG. 26 illustrates a picture header including a deblocking filter-related parameter of a current picture, according to an embodiment.

The video encoding apparatus 1900 may include syntax elements ph_luma_beta_offset_div2, ph_luma_tc_offset_div2, ph_cb_beta_offset_div2, ph_cb_tc_offset_div2, ph_cr_beta_offset_div2, and ph_cr_tc_offset_div2 2620 to a picture header syntax 2600. In detail, when the pps_dbf_info_in_ph_flag 2510 included in the PPS 2500 indicates 1 (2610), the syntax elements ph_luma_beta_offset_div2, ph_luma_tc_offset_div2, ph_cb_beta_offset_div2, ph_cb_tc_offset_div2, ph_cr_beta_offset_div2, and ph_cr_tc_offset_div2 2620 may be included in the picture header syntax 2600.

The video decoding apparatus 1700 may obtain the syntax elements ph_luma_beta_offset_div2, ph_luma_tc_offset_div2, ph_cb_beta_offset_div2, ph_cb_tc_offset_div2, ph_cr_ beta_offset_div2, and ph_cr_tc_offset_div2 2620 from the picture header syntax 2600. In detail, when the pps_dbf_info_in_ph_flag 2510 included in the PPS 2500 indicates 1 (2610), the syntax elements ph_luma_beta_offset_div2, ph_luma_tc_offset_div2, ph_cb_beta_offset_div2, ph_cb_tc_offset_div2, ph_cr_beta_offset_div2, and ph_cr_tc_offset_div2 2620 may be obtained from the picture header syntax 2600.

The syntax element ph_luma_beta_offset_div2 may indicate an offset for a deblocking parameter β applied to luma components of slices in the current picture. The syntax element ph_luma_tC_offset_div2 may indicate an offset for a deblocking parameter tC applied to the luma components of the slices in the current picture. The syntax element ph_cb_beta_offset_div2 may indicate an offset for a deblocking parameter β applied to Cb components of the slices in the current picture. The syntax element ph_cb_tC_offset_div2 may indicate an offset for a deblocking parameter tC applied to the Cb components of the slices in the current picture. The syntax element ph_cr_beta_offset_div2 may indicate an offset for a deblocking parameter β applied to Cr components of the slices in the current picture.

The syntax element ph_cr_tC_offset_div2 may indicate an offset for a deblocking parameter tC applied to the Cr components of the slices in the current picture. The video decoding apparatus 1700 may perform deblocking filtering on boundaries of coding units included in the current picture by using the deblocking filter-related parameter obtained from a picture header.

FIG. 27 illustrates a slice header including a deblocking filter-related parameter of a current slice, according to an embodiment.

The video encoding apparatus 1900 may include syntax elements sh_luma_beta_offset_div2, sh_luma_tc_offset_div2, sh_cb_beta_offset_div2, sh_cb_tc_offset_div2, sh_cr_beta_offset_div2, and sh_cr_tc_offset_div2 2720 to a slice header syntax 2700. In detail, when the pps_dbf_info_in_ph_flag 2510 included in the PPS 2500 indicates 0 (2710), the syntax elements sh_luma_beta_offset_div2, sh_luma_tc_offset_div2, sh_cb_beta_offset_div2, sh_cb_tc_offset_div2, sh_cr_beta_offset_div2, and sh_cr_tc_offset_div2 2720 may be included in the slice header syntax 2700.

The video decoding apparatus 1700 may obtain the syntax elements sh_luma_beta_offset_div2, sh_luma_tc_offset_div2, sh_cb_beta_offset_div2, sh_cb_tc_offset_div2, sh_cr_beta_offset_div2, and sh_cr_tc_offset_div2 2720 from the slice header syntax 2700. In detail, when the pps_dbf_info_in_ph_flag 2510 included in the PPS 2500 indicates 0 (2710), the syntax elements sh_luma_beta_offset_div2, sh_luma_tc_offset_div2, sh_cb_beta_offset_div2, sh_cb_tc_offset_div2, sh_cr_beta_offset_div2, and sh_cr_tc_offset_div2 2720 may be obtained from the slice header syntax 2700.

The syntax element sh_luma_beta_offset_div2 may indicate an offset for a deblocking parameter β applied to luma components of a current slice. The syntax element sh_luma_tC_offset_div2 may indicate an offset for a deblocking parameter tC applied to the luma components of the current slice. The syntax element sh_cb_beta_offset_div2 may indicate an offset for a deblocking parameter β applied to Cb components of the current slice. The syntax element sh_cb_tC_offset_div2 may indicate an offset for a deblocking parameter tC applied to the Cb components of the current slice. The syntax element sh_cr_beta_offset_div2 may indicate an offset for a deblocking parameter β applied to Cr components of the current slice. The syntax element sh_cr_tC_offset_div2 may indicate an offset for a deblocking parameter tC applied to the Cr components of the current slice. The video decoding apparatus 1700 may perform deblocking filtering on boundaries of coding units included in the current slice by using the deblocking filter-related parameter obtained from a slice header.

FIG. 28 illustrates a picture parameter set including information indicating whether a picture header includes various tool-related parameters, according to an embodiment.

The video encoding apparatus 1900 may include pps_rpl_info_in_ph_flag 2810, pps_sao_info_in_ph_flag 2820, pps_alf_info_in_ph_flag 2830, and pps_wp_info_in_ph_flag 2840 to a picture parameter set syntax 2800. The syntax element pps_rpl_info_in_ph_flag 2810 may indicate whether a reference picture list-related parameter for a current picture is present in a picture header of the current picture. The syntax element pps_sao_info_in_ph_flag 2820 may indicate whether a sample adaptive offset (SAO)-related parameter for the current picture is present in the picture header of the current picture. The syntax element pps_alf_info_in_ph_flag 2830 may indicate whether an adaptive loop filtering (ALF)-related parameter for the current picture is present in the picture header of the current picture. The syntax element pps_wp_info_in_ph_flag 2840 may indicate whether a weighted prediction-related parameter for the current picture is present in the picture header of the current picture.

The video decoding apparatus 1700 may parse, from the picture parameter set syntax 2800, pps_rpl_info_in_ph_flag 2810, pps_sao_info_in_ph_flag 2820, pps_alf_info_in_ph_flag 2830, and pps_wp_info_in_ph_flag 2840. The video decoding apparatus 1700 may identify, from the syntax element pps_rpl_info_in_ph_flag 2810, whether the reference picture list-related parameter for the current picture is present in the picture header of the current picture. The video decoding apparatus 1700 may identify, from the syntax element pps_sao_info_in_ph_flag 2820, whether the SAO-related parameter for the current picture is present in the picture header of the current picture. The video decoding apparatus 1700 may identify, from the syntax element pps_alf_info_in_ph_flag 2830, whether the ALF-related parameter for the current picture is present in the picture header of the current picture. The video decoding apparatus 1700 may identify, from the syntax element pps_wp_info_in_ph_flag 2840, whether the weighted prediction-related parameter for the current picture is present in the picture header of the current picture.

FIG. 29 illustrates a picture header including a weighted prediction-related parameter, an SAO-related parameter, and a reference picture list-related parameter of a current picture, according to an embodiment.

The video encoding apparatus 1900 may include a weighted prediction syntax pred_weight_table( ) 2920 to a picture header syntax 2900. In detail, when the pps_wp_info_in_ph_flag 2840 included in the PPS 2800 indicates 1 (2910), the weighted prediction syntax pred_weight_table( ) 2920 may be included in the picture header syntax 2900.

The video decoding apparatus 1700 may invoke the weighted prediction syntax pred_weight_table( ) 2920 from the picture header syntax 2900. In detail, when the pps_wp_info_in_ph_flag 2840 included in the PPS 2800 indicates 1 (2910), the weighted prediction syntax pred_weight_table( ) 2920 may be invoked from the picture header syntax 2900.

The video decoding apparatus 1700 may obtain, from the weighted prediction syntax pred_weight_table( ) 2920, parameters for determining a weight of luma components and a weight for chroma components, which are required to perform weighted prediction. The video decoding apparatus 1700 may perform the weighted prediction on blocks included in a current picture, by using the weight of luma components and the weight of chroma components.

The video encoding apparatus 1900 may include syntax elements ph_sao_luma_enabled_flag and ph_sao_chroma_enabled_flag 2940 to the picture header syntax 2900. In detail, when the pps_sao_info_in_ph_flag 2820 included in the PPS 2800 indicates 1 (2930), the syntax elements ph_sao_luma_enabled_flag and ph_sao_chroma_enabled_flag 2940 may be included in the picture header syntax 2900.

The video decoding apparatus 1700 may obtain the syntax elements ph_sao_luma_enabled_flag and ph_sao_chroma_enabled_flag 2940 from the picture header syntax 2900. In detail, when the pps_sao_info_in_ph_flag 2820 included in the PPS 2800 indicates 1 (2930), the syntax elements ph_sao_luma_enabled_flag and ph_sao_chroma_enabled_flag 2940 may be obtained from the picture header syntax 2900.

The video decoding apparatus 1700 may identify, from the syntax element ph_sao_luma_enabled_flag, whether SAO is performed for the luma component of the current picture. The video decoding apparatus 1700 may identify, from the syntax element ph_sao_chroma_enabled_flag, whether SAO is performed for the chroma component of the current picture. The video decoding apparatus 1700 may perform SAO on each of luma components and chroma components of largest coding units included in the current picture, based on the syntax elements ph_sao_luma_enabled_flag and ph_sao_chroma_enabled_flag 2940.

The video encoding apparatus 1900 may include a reference picture list syntax ref_pic_lists( ) 2960 to the picture header syntax 2900. In detail, when the pps_rpl_info_in_ph_flag 2810 included in the PPS 2800 indicates 1 (2950), the reference picture list syntax ref_pic_lists( ) 2960 may be included in the picture header syntax 2900.

The video decoding apparatus 1700 may invoke the reference picture list syntax ref_pic_lists( ) 2960 from the picture header syntax 2900. In detail, when the pps_rpl_info_in_ph_flag 2810 included in the PPS 2800 indicates 1 (2950), the reference picture list syntax ref_pic_lists( ) 2960 may be invoked from the picture header syntax 2900.

The video decoding apparatus 1700 may obtain, from the reference picture list syntax ref_pic_lists( ) 2960, parameters for determining a reference picture list from the blocks of the current picture. The video decoding apparatus 1700 may determine the reference picture list for the blocks included in the current picture by using the parameters obtained from the reference picture list syntax ref_pic_lists( ) 2960, and perform inter prediction using the reference picture list for each block.

FIG. 30 illustrates a picture header including an ALF-related parameter of a current picture, according to an embodiment.

The video encoding apparatus 1900 may include syntax elements ph_num_alf_aps_ids_luma, ph_alf_aps_id_luma[i], ph_alf_cb_enabled_flag, ph_alf_cr_enabled_flag, ph_alf_aps_id_chroma, ph_alf_cc_cb_enabled_flag, ph_alf_cc_cb_aps_id, ph_alf_cc_cr_enabled_flag, and ph_alf_cc_cr_aps_id 3020 to a picture header syntax 3000. In detail, when the pps_alf_info_in_ph_flag 2830 included in the PPS 2800 indicates 1 (3010), the syntax elements ph_num_alf_aps_ids_luma, ph_alf_aps_id_luma[i], ph_alf_cb_enabled_flag, ph_alf_cr_enabled_flag, ph_alf_aps_id_chroma, ph_alf_cc_cb_enabled_flag, ph_alf_cc_cb_aps_id, ph_alf_cc_cr_enabled_flag, and ph_alf_cc_cr_aps_id 3020 may be included in the picture header syntax 3000.

The video encoding apparatus 1900 may obtain the syntax elements ph_num_alf_aps_ids_luma, ph_alf_aps_id_luma[i], ph_alf_cb_enabled_flag, ph_alf_cr_enabled_flag, ph_alf_aps_id_chroma, ph_alf_cc_cb_enabled_flag, ph_alf_cc_cb_aps_id, ph_alf_cc_cr_enabled_flag, and ph_alf_cc_cr_aps_id 3020 from the picture header syntax 3000. In detail, when the pps_alf_info_in_ph_flag 2830 included in the PPS 2800 indicates 1 (3010), the syntax elements ph_num_alf_aps_ids_luma, ph_alf_aps_id_luma[i], ph_alf_cb_enabled_flag, ph_alf_cr_enabled_flag, ph_alf_aps_id_chroma, ph_alf_cc_cb_enabled_flag, ph_alf_ cc_cb_aps_id, ph_alf_cc_cr_enabled_flag, and ph_alf_cc_ cr_aps_id 3020 may be obtained from the picture header syntax 3000.

The syntax element ph_num_alf_aps_ids_luma indicates the number of ALF APS referred to by slices included in the current picture. The syntax element ph_alf_aps_id_luma[i] indicates aps_adaptation_parameter_set_id of an i-th ALF APS referred to by a luma component of the slices included in the current picture. The syntax element ph_alf_cb_enabled_flag indicates whether ALF is allowed for a Cb component of the current picture. The syntax element ph_alf_cr_enabled_flag indicates whether ALF is allowed fora Cr component of the current picture. The syntax element ph_alf_aps_id_chroma L indicates aps_adaptation_parameter_set_id of ALF APS referred to by a chroma component of the slices included in the current picture. The syntax element ph_alf_cc_cb_enabled_flag indicates whether cross-component ALF is allowed for the Cb component of the current picture. The syntax element ph_alf_cc_cb_aps_id indicates aps_adaptation_parameter_set_id of ALF APS referred to by a Cb component of the slices included in the current picture. The syntax element ph_alf_cc_cr_enabled_flag indicates whether cross-component ALF is allowed for the Cr component of the current picture. The syntax element ph_alf_cc_cr_aps_id indicates aps_adaptation_parameter_set_id of ALF APS referred to by a Cr component of the slices included in the current picture.

The video decoding apparatus 1700 may perform ALF on a luma component and chroma component for each largest coding unit of the current picture by using the obtained syntax elements ph_num_alf_aps_ids_luma, ph_alf_aps_id_ luma[i], ph_alf_cb_enabled_flag, ph_alf_cr_enabled_flag, ph_alf_aps_id_chroma, ph_alf_cc_cb_enabled_flag, ph_alf_cc_cb_aps_id, ph_alf_cc_cr_enabled_flag, and ph_alf_cc_cr_aps_id 3020.

FIG. 31 illustrates a slice header including a reference picture list-related parameter, a weighted prediction-related parameter, and an SAO-related parameter of a current slice, according to an embodiment.

The video encoding apparatus 1900 may include a reference picture list syntax ref_pic_lists( ) 3120 to a slice header syntax 3100. In detail, when the pps_rpl_info_in_ph_flag 2810 included in the PPS 2800 indicates 0 (3110), the reference picture list syntax ref_pic_lists( ) 3120 may be included in the slice header syntax 3100.

The video decoding apparatus 1700 may invoke the reference picture list syntax ref_pic_lists( ) 3120 from the slice header syntax 3100. In detail, when the pps_rpl_info_in_ph_flag 2810 included in the PPS 2800 indicates 0 (3110), the reference picture list syntax ref_pic_lists( ) 3120 may be invoked from the slice header syntax 3100.

The video decoding apparatus 1700 may obtain, from the reference picture list syntax ref_pic_lists( ) 3120, parameters for determining a reference picture list from blocks of a current slice. The video decoding apparatus 1700 may determine the reference picture list for the blocks included in the current slice by using the parameters obtained from the reference picture list syntax ref_pic_lists( ) 3120, and perform inter prediction using the reference picture list for each block.

The video encoding apparatus 1900 may include a weighted prediction syntax pred_weight_table( ) 3140 to the slice header syntax 3100. In detail, when the pps_wp_info_in_ph_flag 2840 included in the PPS 2800 indicates 0 (3130), the weighted prediction syntax pred_weight_table( ) 3140 may be included in the slice header syntax 3100.

The video decoding apparatus 1700 may invoke the weighted prediction syntax pred_weight_table( ) 3140 from the slice header syntax 3100. In detail, when the pps_wp_info_in_ph_flag 2840 included in the PPS 2800 indicates 0 (3130), the weighted prediction syntax pred_weight_table( ) 3140 may be invoked from the slice header syntax 3100.

The video decoding apparatus 1700 may obtain, from the weighted prediction syntax pred_weight_table( ) 3140, parameters for determining a weight of luma components and a weight for chroma components, which are required to perform weighted prediction. The video decoding apparatus 1700 may perform the weighted prediction on the blocks included in the current slice, by using the weight of luma components and the weight of chroma components.

The video encoding apparatus 1900 may include syntax elements sh_sao_luma_used_flag and sh_sao_chroma_used_flag 3160 to the slice header syntax 3100. In detail, when the pps_sao_info_in_ph_flag 2820 included in the PPS 2800 indicates 0 (3150), the syntax elements sh_sao_luma_used_flag and sh_sao_chroma_used_flag 3160 may be included in the slice header syntax 3100.

The video decoding apparatus 1700 may obtain the syntax elements sh_sao_luma_used_flag and sh_sao_chroma_used_flag 3160 from the slice header syntax 3100. In detail, when the pps_sao_info_in_ph_flag 2820 included in the PPS 2800 indicates 0 (3150), the syntax elements sh_sao_luma_used_flag and sh_sao_chroma_used_flag 3160 may be obtained from the slice header syntax 3100.

The video decoding apparatus 1700 may identify, from the syntax element sh_sao_luma_used_flag, whether SAO is used for a luma component of the current slice. The video decoding apparatus 1700 may identify, from the syntax element sh_sao_chroma_used_flag, whether SAO is used for a chroma component of the current slice. The video decoding apparatus 1700 may perform SAO on each of luma components and chroma components of largest coding units included in the current slice, based on the syntax elements sh_sao_luma_used_flag and sh_sao_chroma_used_flag 3160.

FIG. 32 illustrates a slice header including an ALF-related parameter of a current slice, according to an embodiment.

The video encoding apparatus 1900 may include syntax elements sh_num_alf_aps_ids_luma, sh_alf_aps_id_luma[i], sh_alf_cb_enabled_flag, sh_alf_cr_enabled_flag, sh_alf_aps_id_chroma, sh_alf_cc_cb_enabled_flag, sh_alf_cc_cb_aps_id, sh_alf_cc_cr_enabled_flag, and sh_alf_cc_cr_aps_id 3220 to a slice header syntax 3200. In detail, when the pps_alf_info_in_ph_flag 2830 included in the PPS 2800 indicates 0 (3210), the syntax elements sh_num_alf_aps_ids_luma, sh_alf_aps_id_luma[i], sh_alf_cb_enabled_flag, sh_alf_cr_enabled_flag, sh_alf_aps_id_chroma, sh_alf_cc_cb_enabled_flag, sh_alf_cc_cb_aps_id, sh_alf_cc_cr_enabled_flag, and sh_alf_cc_cr_aps_id 3220 may be included in the slice header syntax 3200.

The video encoding apparatus 1900 may obtain the syntax elements sh_num_alf_aps_ids_luma, sh_alf_aps_id_luma[i], sh_alf_cb_enabled_flag, sh_alf_cr_enabled_flag, sh_alf_aps_id_chroma, sh_alf_cc_cb_enabled_flag, sh_alf_cc_cb_aps_id, sh_alf_cc_cr_enabled_flag, and sh_alf_cc_cr_aps_id 3220 from the slice header syntax 3200. In detail, when the pps_alf_info_in_ph_flag 2830 included in the PPS 2800 indicates 0 (3210), the syntax elements sh_num_alf_aps_ids_luma, sh_alf_aps_id_luma[i], sh_alf_cb_enabled_flag, sh_alf_cr_enabled_flag, sh_alf_aps_id_chroma, sh_alf_cc_cb_enabled_flag, sh_alf_cc_cb_aps_id, sh_alf_cc_cr_enabled_flag, and sh_alf_cc_cr_aps_id 3220 may be obtained from the slice header syntax 3200.

The syntax element sh_num_alf_aps_ids_luma indicates the number of ALF APSs referred to by the current slice. The syntax element sh_alf_aps_id_luma[i] indicates aps_adaptation_parameter_set_id of i-th ALF APS referred to by a luma component of the current slice. The syntax element sh_alf_cb_enabled_flag indicates whether ALF is allowed for a Cb component of the current slice. The syntax element sh_alf_cr_enabled_flag indicates whether ALF is allowed for a Cr component of the current slice. The syntax element sh_alf_aps_id_chroma indicates aps_adaptation_parameter_set_id of ALF APS referred to by a chroma component of the current slice. The syntax element sh_alf_cc_cb_enabled_ flag indicates whether cross-component ALF is allowed for the Cb component of the current slice. The syntax element sh_alf_cc_cb_aps_id indicates aps_adaptation_parameter_set_id of ALF APS referred to by the Cb component of the current slice. The syntax element sh_alf_cc_cr_enabled_flag indicates whether cross-component ALF is allowed for the Cr component of the current slice. The syntax element sh_alf_cc_cr_aps_id indicates aps_adaptation_parameter_set_id of ALF APS referred to by the Cr component of the current slice.

The video decoding apparatus 1700 may perform ALF on a luma component and chroma component for each largest coding unit of the current slice by using the obtained syntax elements sh_num_alf_aps_ids_luma, sh_alf_aps_id_luma [i], sh_alf_cb_enabled_flag, sh_alf_cr_enabled_flag, sh_alf_aps_id_chroma, sh_alf_cc_cb_enabled_flag, sh_alf_cc_cb_aps_id, sh_alf_cc_cr_enabled_flag, and sh_alf_cc_cr_aps_id 3220.

The video decoding apparatus 1700 according to an embodiment and the video encoding apparatus 1900 according to an embodiment may selectively signal a deblocking filter-related parameter, a reference picture list-related parameter, a weighted prediction-related parameter, an SAO-related parameter, and an ALF-related parameter for each picture or for each slice. Accordingly, the video encoding apparatus 1900 according to an embodiment may determine whether to signal a tool-related parameter for each picture or signal the tool-related parameter for each slice, according to a data transmission efficiency or characteristic of a data picture, and signal the tool-related parameter according to a method having high transmission efficiency. The video decoding apparatus 1700 according to an embodiment may determine whether to obtain the tool-related parameter for each picture or obtain the tool-related parameter for each slice, based on information obtained from a picture parameter set, and obtain the tool-related parameter for each picture or for each slice. Accordingly, when the tool-related parameter is signaled for each picture, the tool-related parameter is not required to be signaled for each slice included in a picture, and thus data for signaling the tool-related parameter may be reduced.

Meanwhile, the embodiments of the disclosure described above may be written as computer-executable programs that may be stored in a medium.

The medium may continuously store the computer-executable programs, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. A machine-readable storage medium may be provided in a form of a non-transitory storage medium. Here, the 'non-transitory storage medium' only denotes a tangible device and does not contain a signal (for example, electromagnetic waves). This term does not distinguish a case where data is stored in the storage medium semi-permanently and a case where the data is stored in the storage medium temporarily. For example, the 'non-transitory storage medium' may include a buffer where data is temporarily stored.

Other examples of the medium include recording media and storage media managed by application stores distributing applications or by websites, servers, and the like supplying or distributing other various types of software.

According to an embodiment, a method according to various embodiments disclosed in the present specification may be provided by being included in a computer program product. The computer program products are products that can be traded between sellers and buyers. The computer program product may be distributed in a form of machine-readable storage medium (for example, a compact disc read-only memory (CD-ROM)), or distributed (for example, downloaded or uploaded) through an application store (for example, Play Store™) or directly or online between two user devices (for example, smart phones). In the case of online distribution, at least a part of the computer program product (for example, a downloadable application) may be at least temporarily generated or temporarily stored in a machine-readable storage medium, such as a server of a manufacturer, a server of an application store, or a memory of a relay server.

While one or more embodiments of the disclosure have been described with reference to the figures, it will be understood by those of ordinary skill in the art that various changes in form and details may be made therein without departing from the spirit and scope as defined by the following claims.

The invention claimed is:

1. A video decoding method comprising:
obtaining, from a picture parameter set, a quantization parameter (QP) initial value to be applied to a current picture;
obtaining, from the picture parameter set, a QP difference value flag indicating whether a QP difference value is present in a picture header of the current picture;
when the QP difference value flag indicates that the QP difference value is present in the picture header of the current picture, obtaining a first QP difference value for the current picture from the picture-header, determining a first QP for at least one slice included in the current picture using the QP initial value and the first QP difference value obtained for the current picture, and performing inverse-quantization on transformation coefficients included in a first slice among the at least one slice using the first QP for the at least one slice; and
when the QP difference value flag indicates that the QP difference value is not present in the picture header, obtaining a second QP difference value for a current slice included in the current picture from a slice header of the current-slice, determining a second QP for the current slice included in the current picture using the QP initial value and the second QP difference value obtained for the current slice, and performing inverse-quantization on transformation coefficients included in the current slice using the second QP for the current slice,
wherein, when the first QP difference value is obtained from the picture header for the current picture according to the QP difference value flag, the second QP difference value for the current slice included in the current picture is not obtained from the slice header for the current slice and the second QP for the current slice included in the current picture is determined without the second QP difference value for the current slice.

2. A video encoding apparatus comprising:
an encoder configured to perform quantization on transformation coefficients included in a current picture; and a bitstream generator configured to encode a quantization parameter (QP) initial value to be applied to the current picture, encode a QP difference value flag indicating whether a QP difference value is present in a picture header of the current picture, and generate a picture parameter set including the QP initial value and the QP difference value flag, wherein, when the QP difference value flag indicates that the QP difference value is present in the picture header, the encoder performs quantization on transformation coefficients included in a first slice among at least one slice included in the current picture using a first QP for the at least one slice included in the current picture, and the bitstream generator encodes a first QP difference value between the first QP for the at least one slice and the QP initial value and generates the picture header for the current picture to include the first QP difference value for the at least one slice included in the current picture, and wherein, when the QP difference value flag indicates that the QP difference value is not present in the picture header, the encoder performs quantization on transformation coefficients included in a current slice included in the current picture using a second QP for the current slice, and the bitstream generator encodes a second QP difference value between the second QP for the current slice and the QP initial value and generates a current slice header of the current slice to include the second QP difference value for the current slice, wherein, when the QP difference value flag indicates that the QP difference value is present in the picture header:

the second QP for the current slice included in the current picture is determined by adding the QP initial value and the first QP difference value for the at least one slice included in the current picture, the second QP difference value for the current slice included in the current picture is not determined, and the second QP difference value for the current slice included in the current picture is not included in a slice header for the current slice.

3. A method of transmitting a bitstream generated by encoding a video, the method comprising:

performing quantization on transformation coefficients included in a current picture;

encoding a quantization parameter (QP) initial value to be applied to the current picture;

encoding a QP difference value flag indicating whether a QP difference value is present in a picture header of the current picture;

generating a picture parameter set (PPS) including the QP initial value and the QP difference value flag; and outputting a bitstream including the PPS, wherein, when the QP difference value flag indicates that the QP difference value is present in the picture header, quantization is performed on transformation coefficients included in a first slice among at least one slice included in the current picture using a first QP for the at least one slice included in the current picture, a first QP difference value is encoded, the first QP difference value indicating a value between the QP initial value and a first QP for the at least one slice included in the current picture, and the picture header for the current picture is generated to include the first QP difference value for the at least one slice included in the current picture, the QP difference value for a slice included in the current picture being not encoded into a slice header of the slice, and wherein, when the QP difference value flag indicates that the QP difference value is not present in the picture header, quantization is performed on transformation coefficients included in a current slice included in the current picture using a second QP for the current slice, a second QP difference value is encoded, the second QP indicating a value between the QP initial value and the second QP used for the current slice, and a current slice header for the current slice is generated to include the second QP difference value for the current slice, wherein, when the QP difference value flag indicates that the QP difference value is present in the picture header:

the second QP for the current slice included in the current picture is determined by adding the QP initial value and the first QP difference value for the at least one slice included in the current picture, the second QP difference value for the current slice included in the current picture is not determined, and the second QP difference value for the current slice included in the current picture is not included in the slice header for the current slice.

* * * * *